US012111488B1

(12) United States Patent
Kanekal

(10) Patent No.: US 12,111,488 B1
(45) Date of Patent: Oct. 8, 2024

(54) SYMBOLIC DISPLAY ELEMENTS UTILIZING SIDE EMITTING FIBERS AND LIGHT SOURCES

(71) Applicant: Hemanth Gundurao Kanekal, Cupertino, CA (US)

(72) Inventor: Hemanth Gundurao Kanekal, Cupertino, CA (US)

(*) Notice: Subject to any disclaimer, the term of this patent is extended or adjusted under 35 U.S.C. 154(b) by 4 days.

(21) Appl. No.: 18/219,291

(22) Filed: Jul. 7, 2023

(51) Int. Cl.
| | |
|---|---|
| *F21V 8/00* | (2006.01) |
| *G02B 6/02* | (2006.01) |
| *G09F 7/00* | (2006.01) |
| *G09F 7/16* | (2006.01) |
| *G09F 9/30* | (2006.01) |
| *G09F 9/302* | (2006.01) |
| *G09F 13/18* | (2006.01) |
| *G09F 13/00* | (2006.01) |

(52) U.S. Cl.
CPC ........... *G02B 6/001* (2013.01); *G02B 6/0055* (2013.01); *G02B 6/006* (2013.01); *G02B 6/0065* (2013.01); *G02B 6/0076* (2013.01); *G02B 6/0083* (2013.01); *G02B 6/0086* (2013.01); *G09F 7/00* (2013.01); *G09F 7/16* (2013.01); *G09F 9/30* (2013.01); *G09F 9/302* (2013.01); *G09F 13/18* (2013.01); *G09F 13/005* (2013.01); *G09F 2013/184* (2013.01)

(58) Field of Classification Search
CPC ...... G02B 6/001; G02B 6/006; G02B 6/0055; G02B 6/0065; G02B 6/0076; G02B 6/0083; G02B 6/0086; G09F 13/18; G09F 2013/1895; G09F 2013/189; G09F 13/00; G09F 7/00; G09F 7/16; G09F 9/30; G09F 9/302; G09F 13/005; G09F 2013/184
See application file for complete search history.

(56) References Cited

U.S. PATENT DOCUMENTS

| | | | | |
|---|---|---|---|---|
| 1,930,359 | A * | 10/1933 | Hilgenberg | G02B 6/0071 40/442 |
| 2,623,313 | A * | 12/1952 | Fuchs | G02B 6/0091 362/812 |
| 3,497,981 | A * | 3/1970 | Tyne | G09F 13/24 362/559 |
| 4,422,719 | A * | 12/1983 | Orcutt | G02B 6/02033 362/582 |
| 4,510,555 | A * | 4/1985 | Mori | F21S 6/002 362/330 |

(Continued)

FOREIGN PATENT DOCUMENTS

| | | | | |
|---|---|---|---|---|
| CN | 1147876 A | * | 4/1997 | ........... G02B 6/0026 |
| CN | 1487312 A | * | 4/2004 | ............ B82Y 10/00 |

(Continued)

*Primary Examiner* — Michelle R Connelly

(57) ABSTRACT

A symbolic display element comprised of light emitting device coupled to side emitting fiber is disclosed. This symbolic element is an information display when the side emitting fiber substrate with specific light conducting and emitting properties is coupled with the light emitting device and the light emission is controlled by any means or methods. A method for forming the substrate into a symbolic shape is disclosed. A method of coupling light emitting device to the substrate is also disclosed. A method for using a plurality of such symbolic elements as information display is also disclosed.

19 Claims, 16 Drawing Sheets

(56) References Cited

U.S. PATENT DOCUMENTS

| | | | | |
|---|---|---|---|---|
| 5,572,818 A * | 11/1996 | Churchill | ............ | G02B 6/0028 362/556 |
| 5,606,634 A * | 2/1997 | LeBihan | ................ | G09F 9/305 385/125 |
| 5,737,472 A * | 4/1998 | Bernasson | ............ | G02B 6/001 385/12 |
| 6,030,108 A * | 2/2000 | Ishiharada | ................ | E01F 9/20 362/582 |
| 6,104,857 A * | 8/2000 | Ishiharada | ......... | G02B 6/02033 385/141 |
| 6,234,656 B1 * | 5/2001 | Hosseini | ................ | G02B 6/001 362/558 |
| 6,636,686 B1 * | 10/2003 | Belfer | ...................... | G02B 6/04 385/115 |
| 7,246,932 B2 * | 7/2007 | Burtsev | ................ | G02B 6/0083 362/601 |
| 7,762,704 B2 * | 7/2010 | Brychell | ................ | G09F 13/22 40/442 |
| 8,475,025 B2 * | 7/2013 | Ott | ........................ | G02B 6/001 362/23.17 |
| 10,908,342 B2 * | 2/2021 | Schabacker | ............... | F21K 9/61 |
| 2009/0185389 A1 * | 7/2009 | Tessnow | ............ | G02B 6/0038 362/516 |
| 2010/0118403 A1 * | 5/2010 | Laitinen | ................ | G02B 6/006 359/569 |
| 2014/0340886 A1 * | 11/2014 | Deutsch | ................ | F21S 10/023 362/231 |
| 2017/0293060 A1 * | 10/2017 | Hayashi | ................ | A63H 27/10 |
| 2017/0357117 A1 * | 12/2017 | Fujita | ........................ | G09F 9/35 |
| 2018/0231711 A1 * | 8/2018 | Kanamori | ........ | B29D 11/00663 |
| 2019/0057627 A1 * | 2/2019 | Mullett | ................ | H05B 45/20 |
| 2020/0003943 A1 * | 1/2020 | Kitamura | ............... | G02B 6/001 |

FOREIGN PATENT DOCUMENTS

| | | | | |
|---|---|---|---|---|
| CN | 201716947 U | * | 1/2011 | |
| CN | 203598410 U | * | 5/2014 | |
| CN | 110465745 B | * | 12/2021 | ........... B23K 26/362 |
| CN | 115479250 A | * | 12/2022 | |
| DE | 3908697 A | * | 9/1990 | ........... B42D 15/022 |
| EP | 0962693 A1 | * | 12/1999 | ........... G02B 6/0076 |
| EP | 3514784 A1 | * | 7/2019 | ............. G02B 6/006 |
| EP | 3477188 B1 | * | 4/2024 | ................. B60Q 3/62 |
| FR | 2730037 A1 | * | 8/1996 | ............. B60Q 3/004 |
| JP | 11217000 A | * | 8/1999 | ............. G02B 6/001 |
| JP | 2001312233 A | * | 11/2001 | |
| JP | 2011227253 A | * | 11/2011 | |

\* cited by examiner

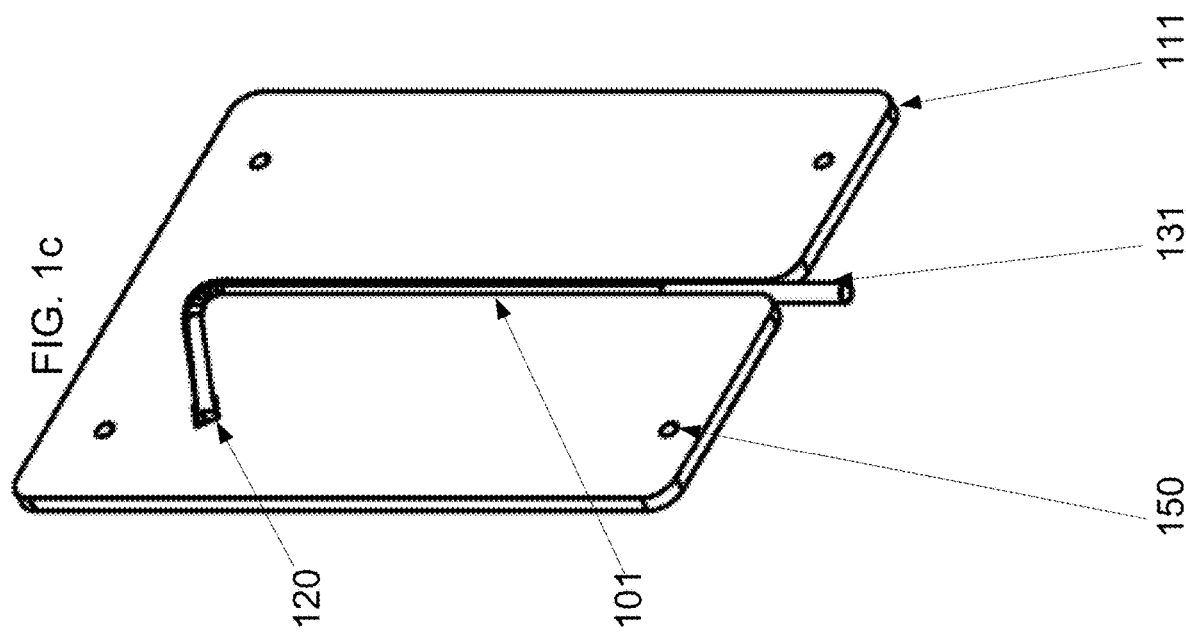
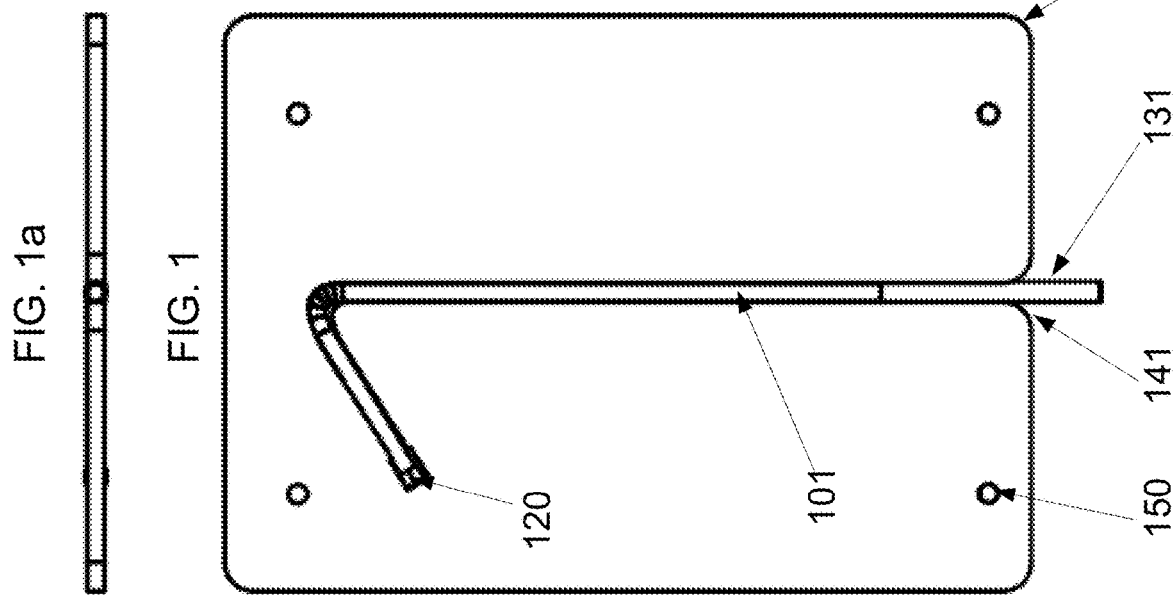

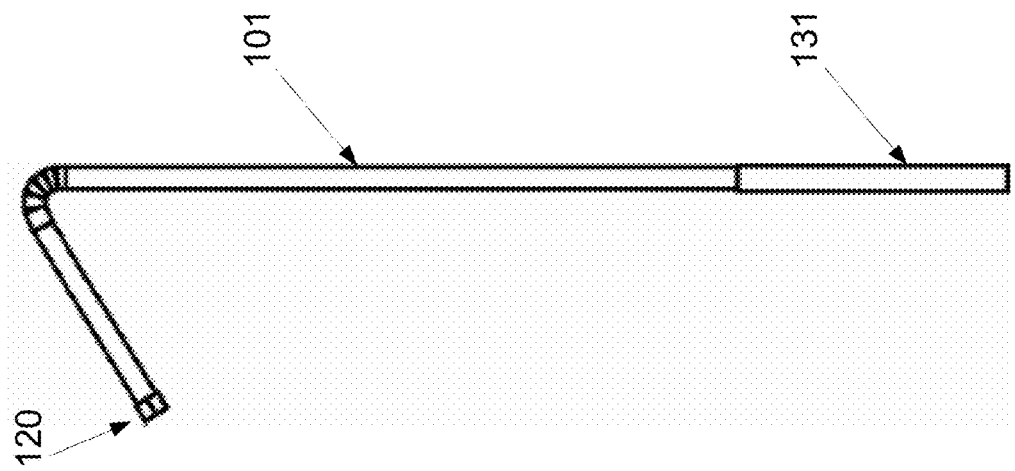
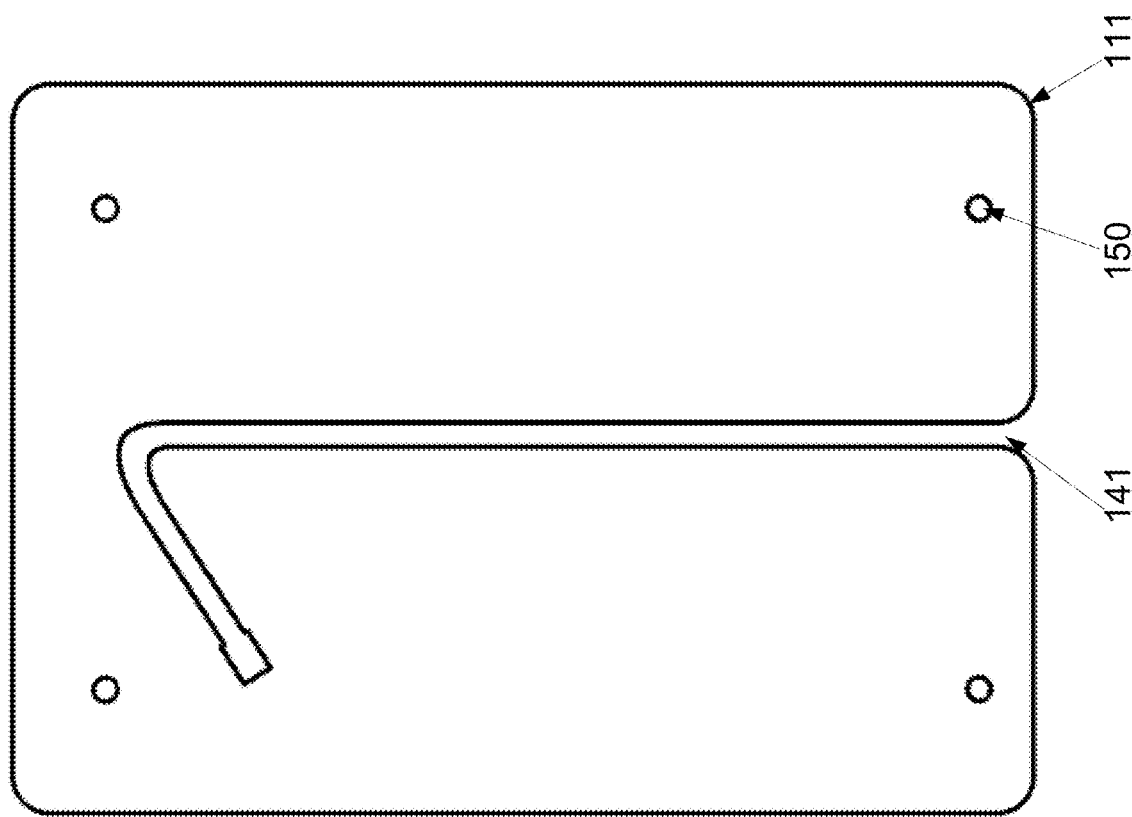

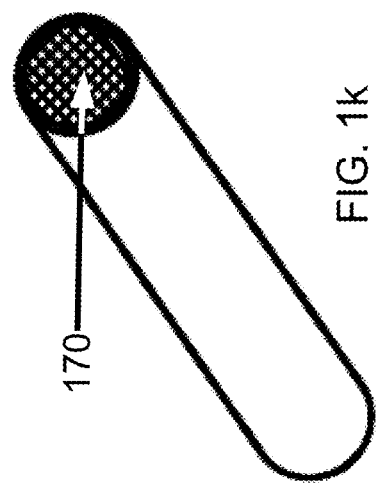
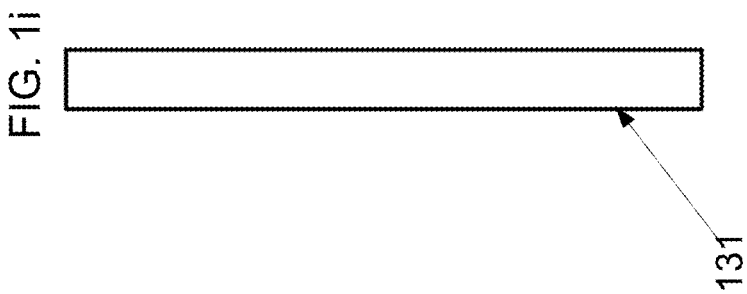
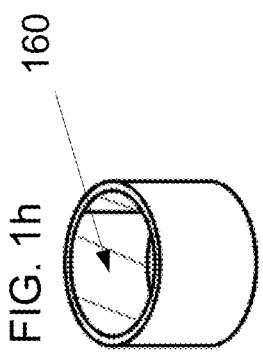
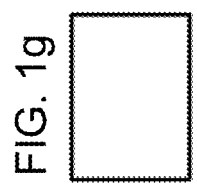
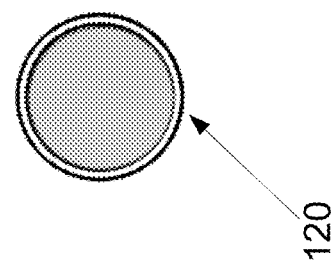

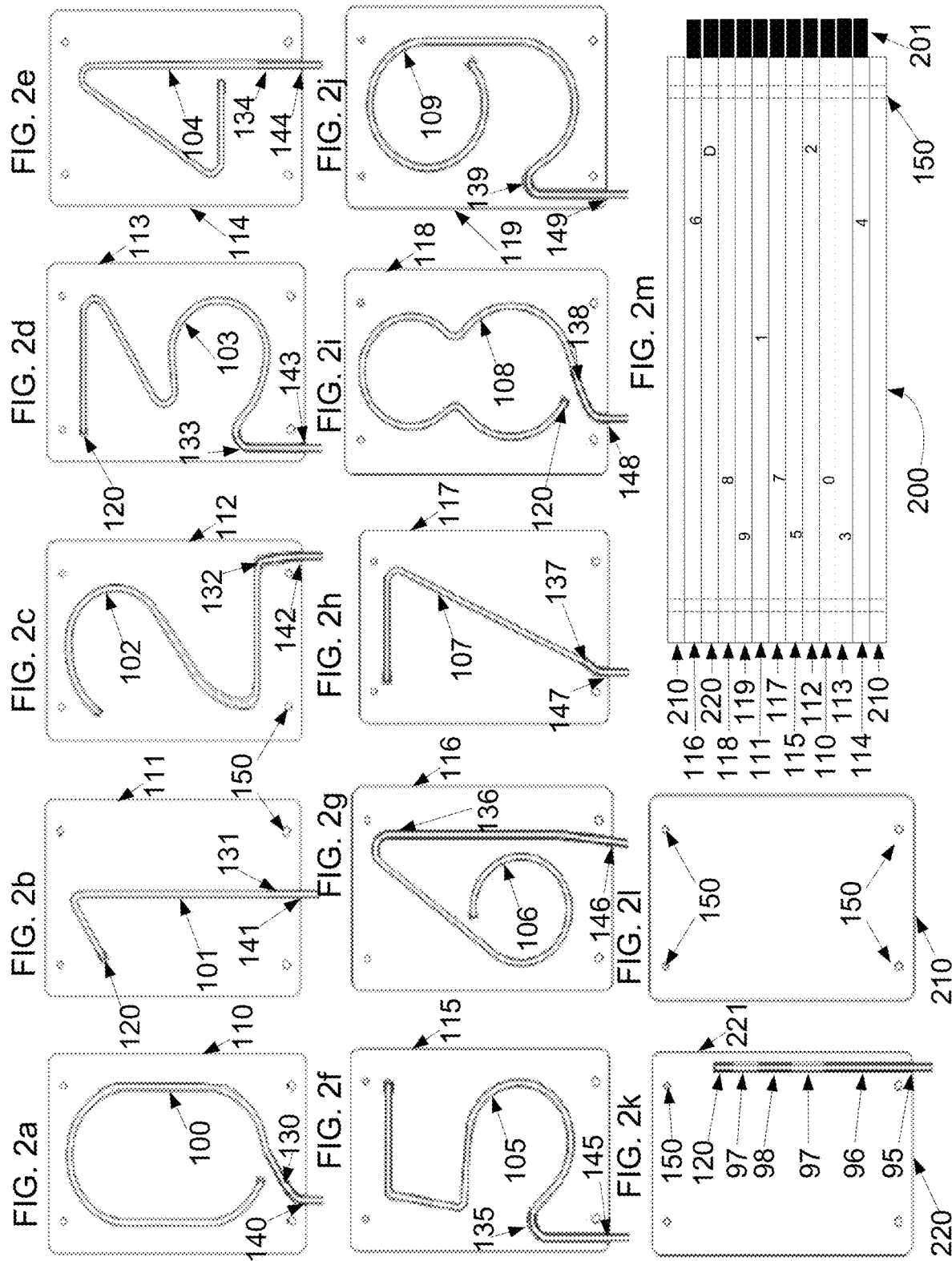

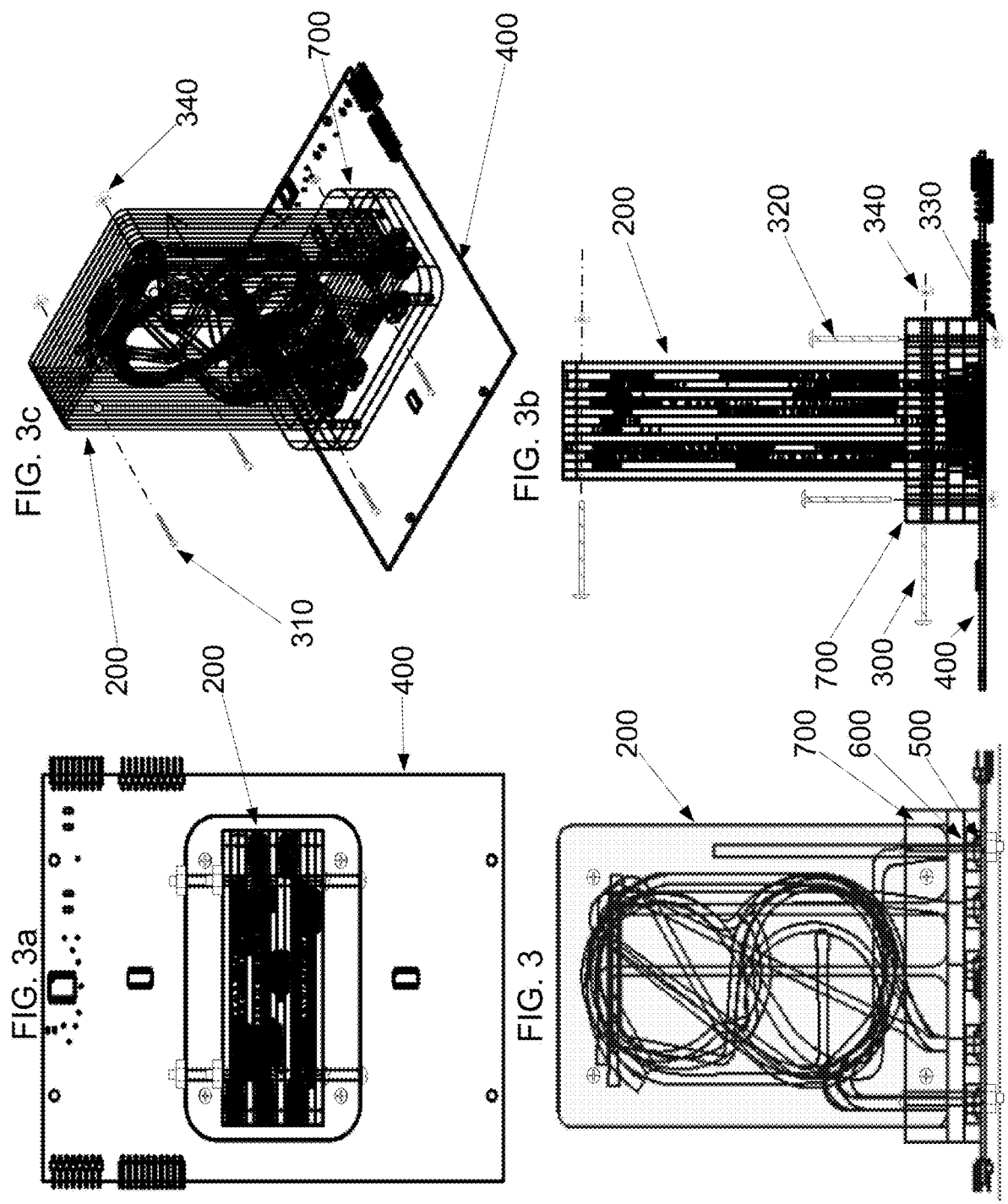

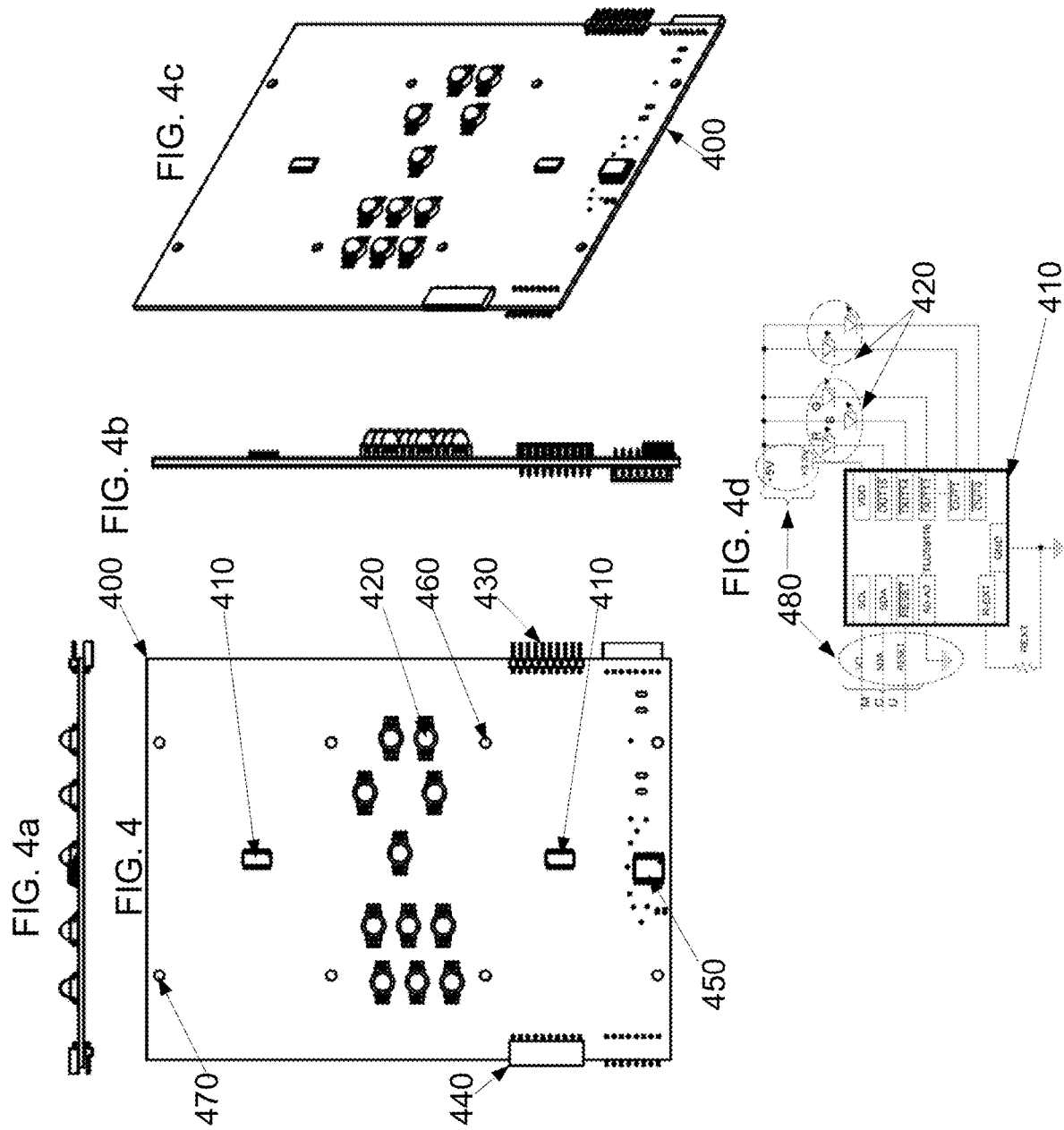

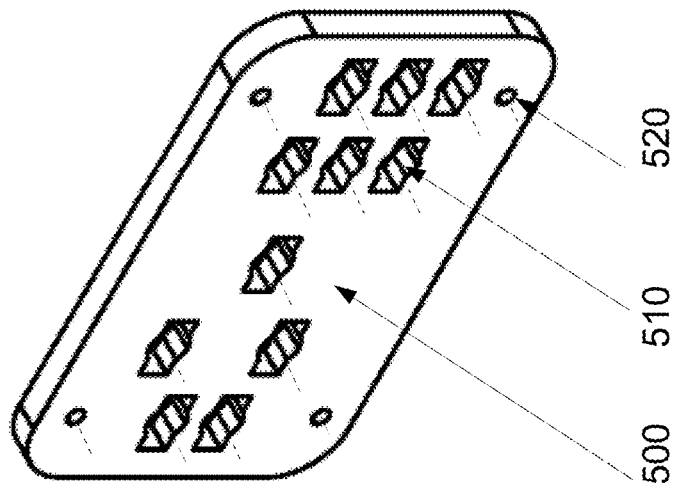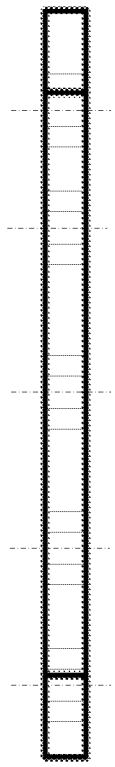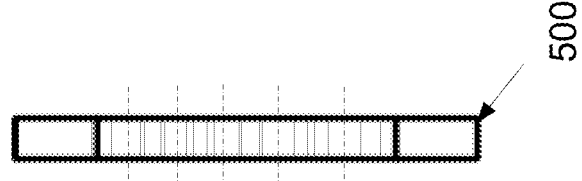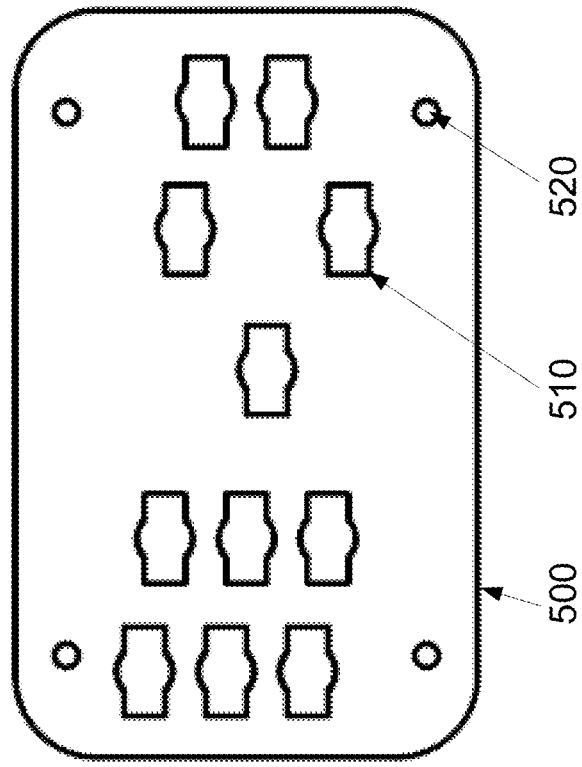

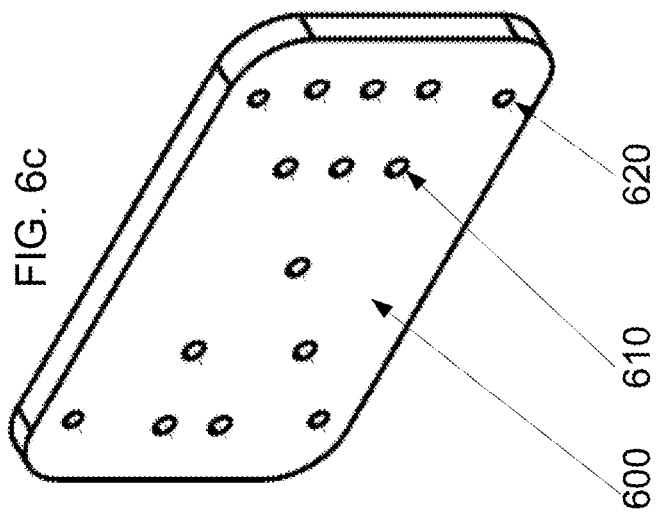
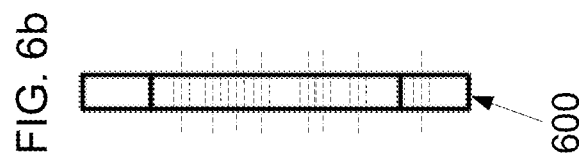
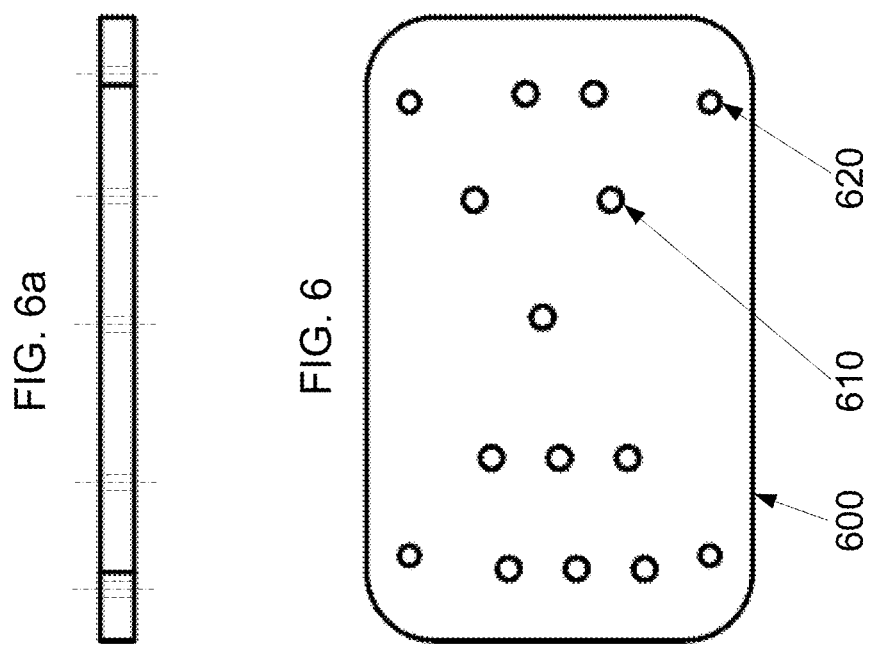

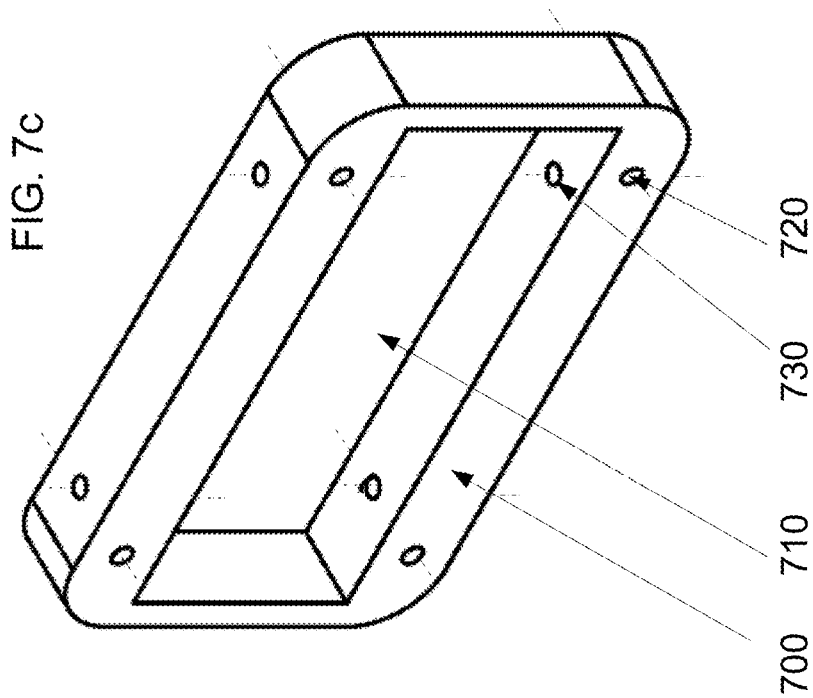
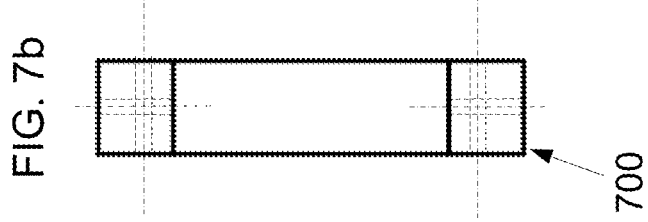
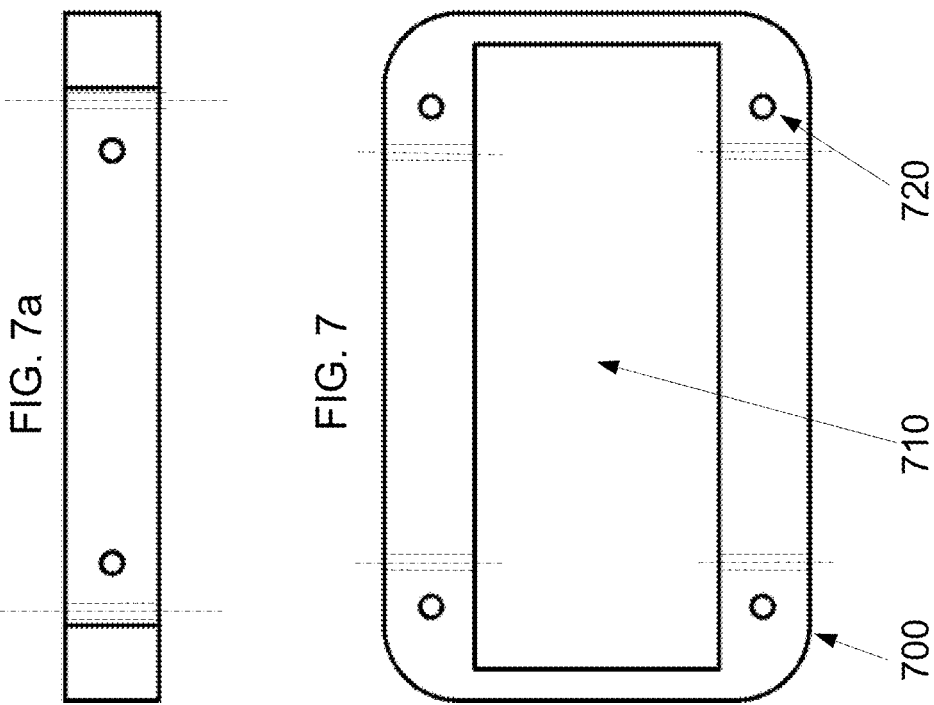

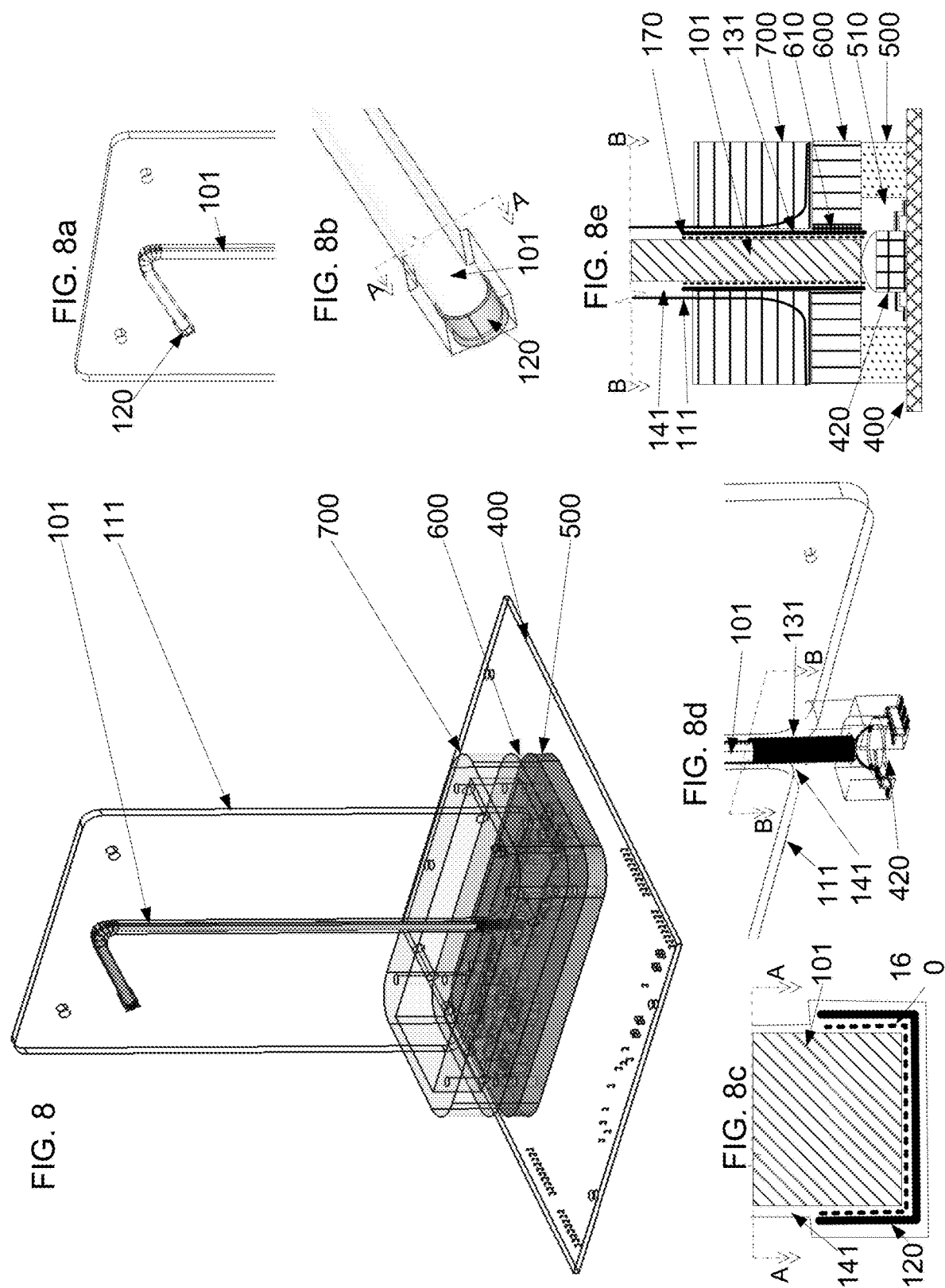

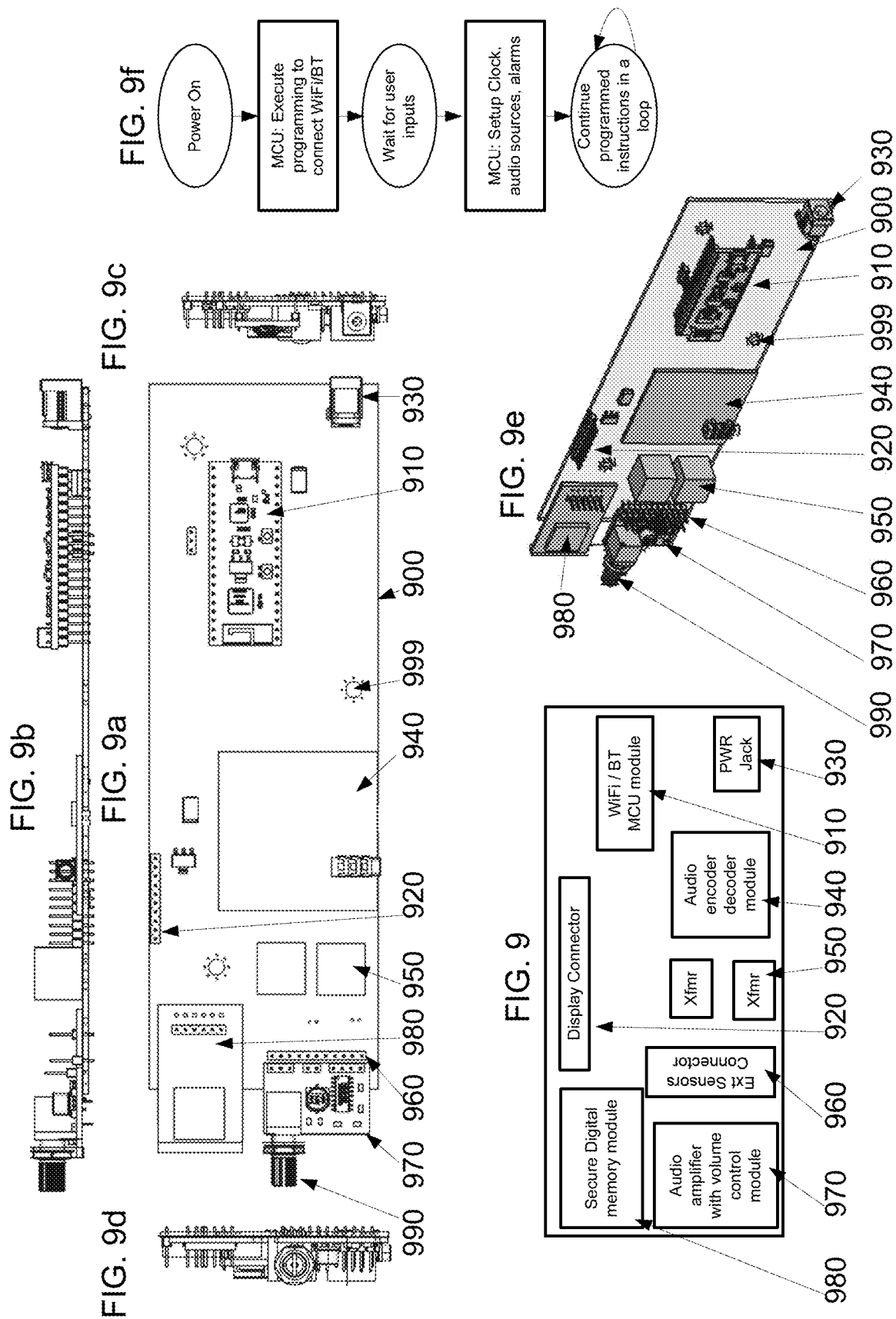

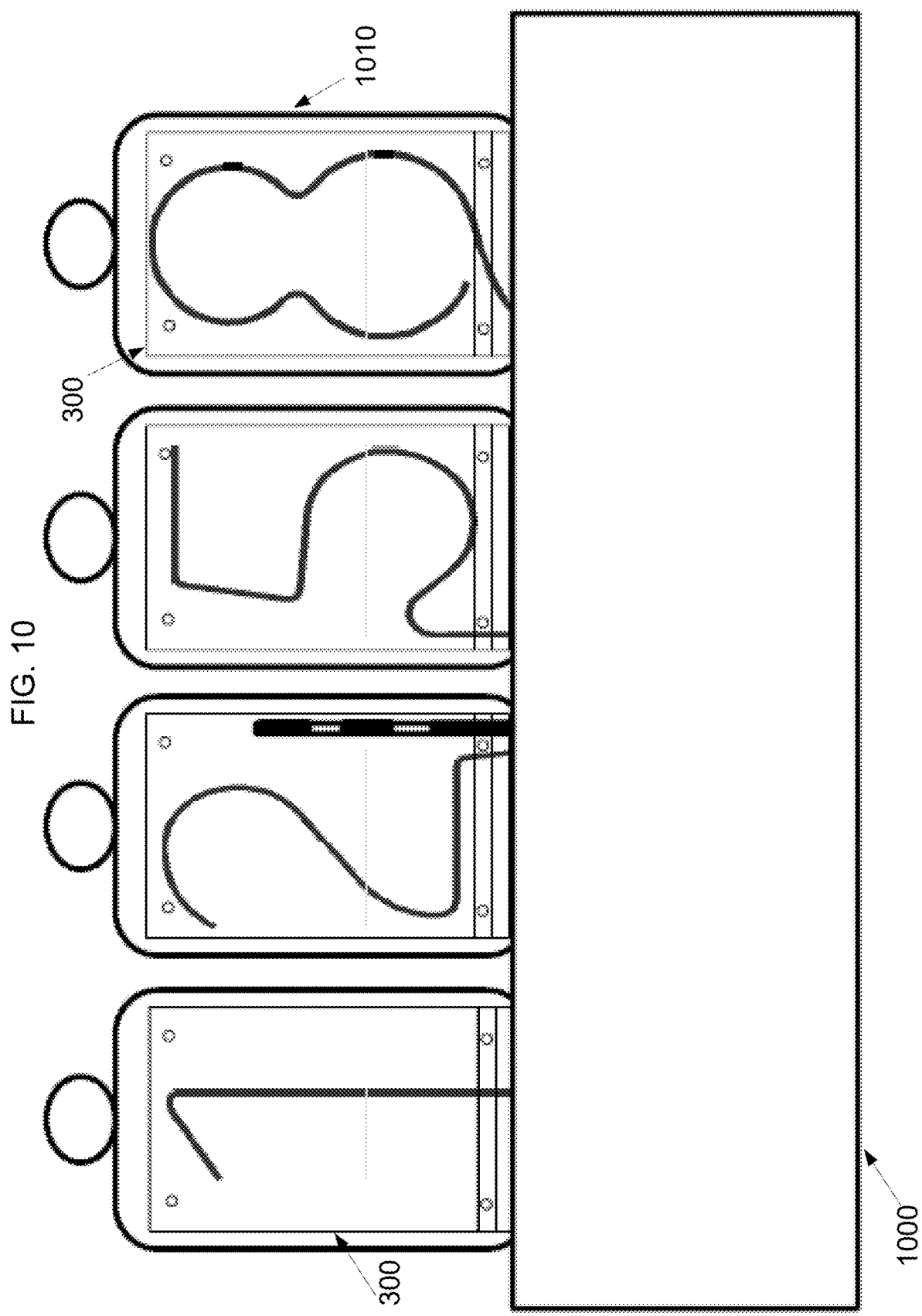

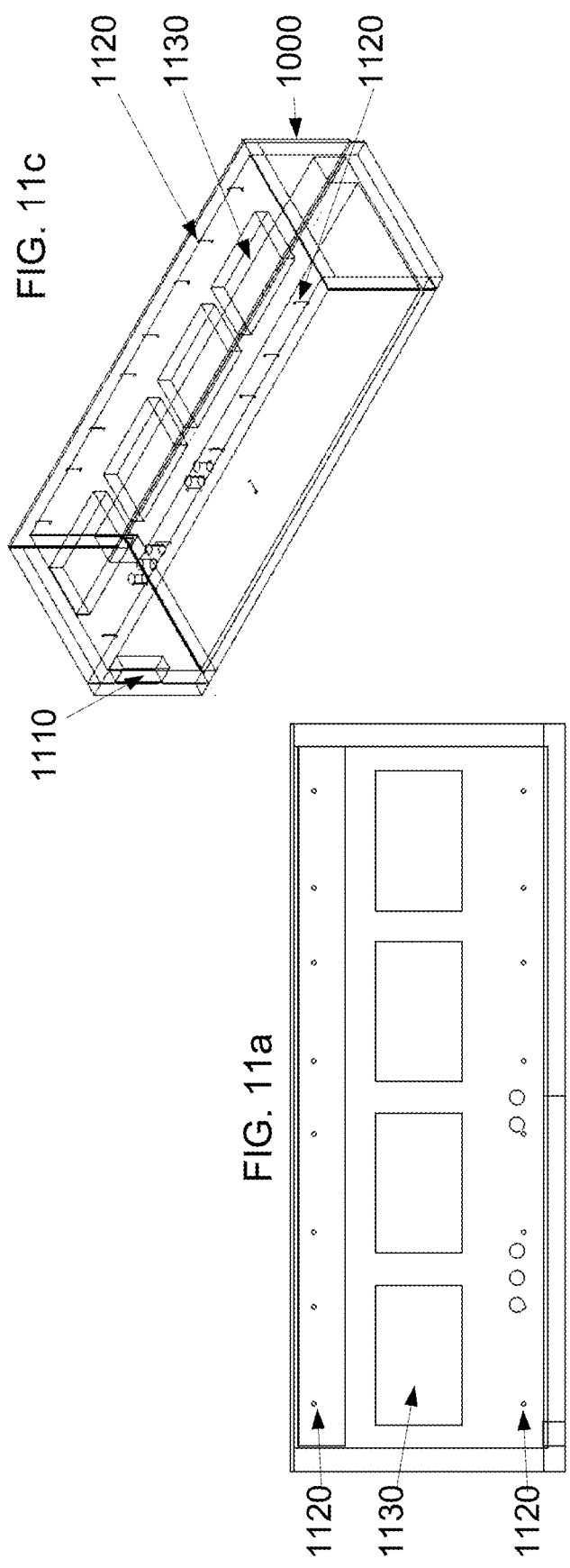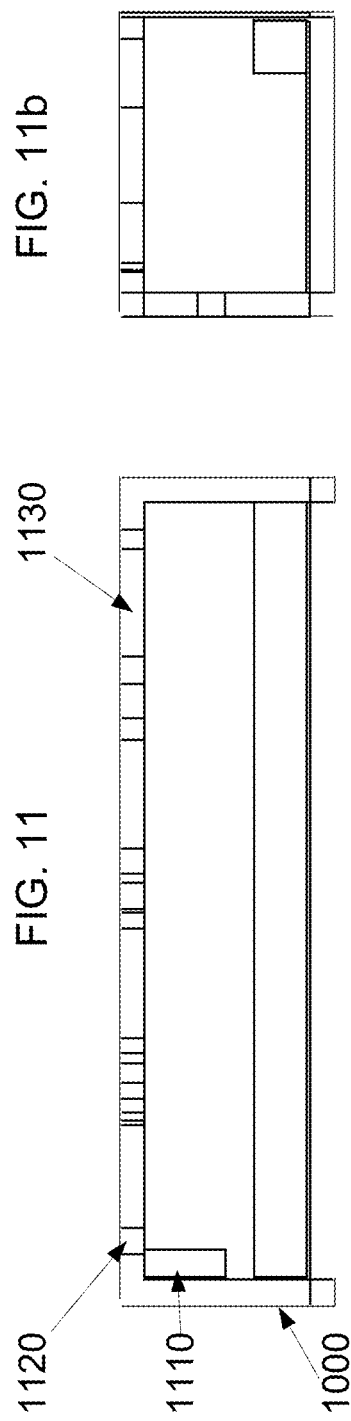

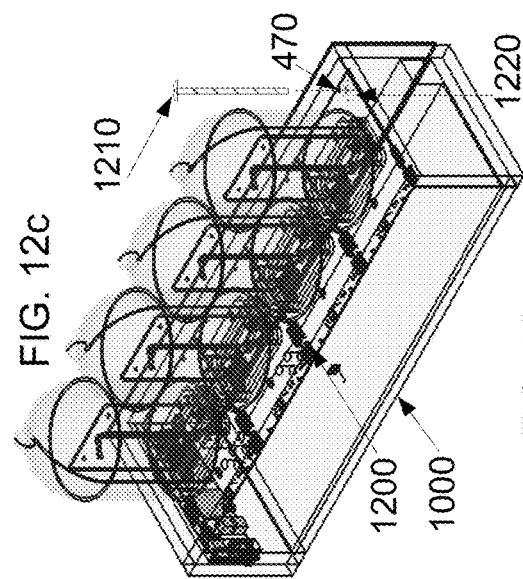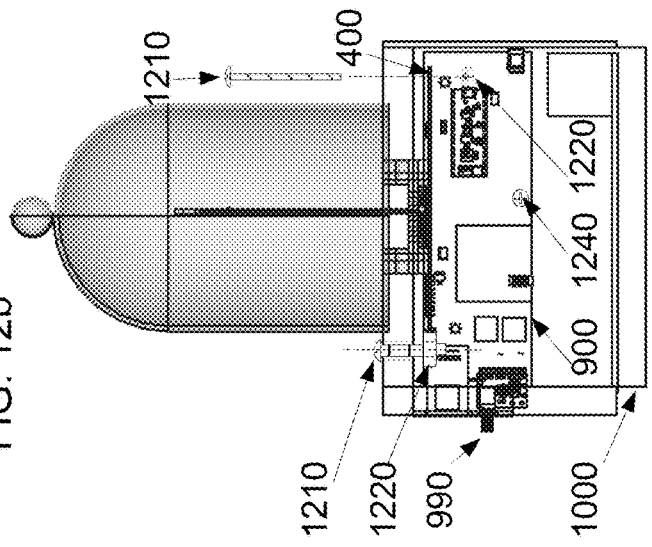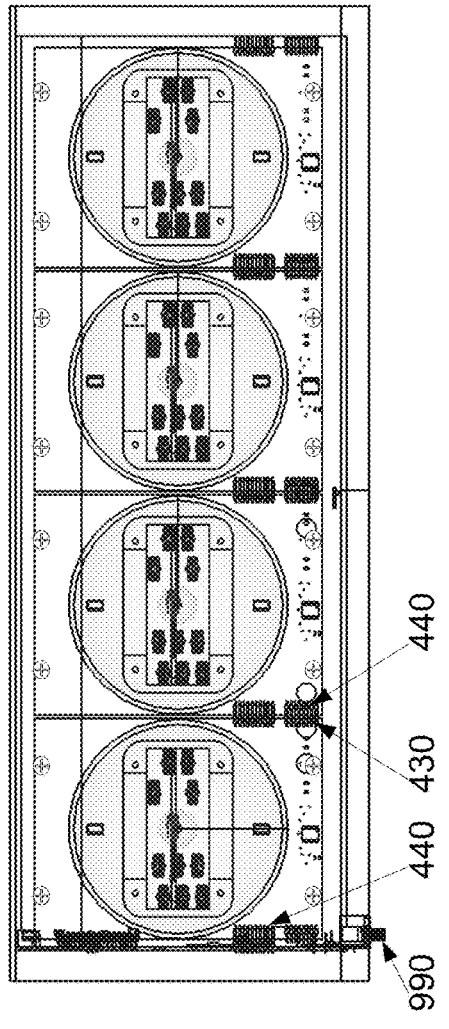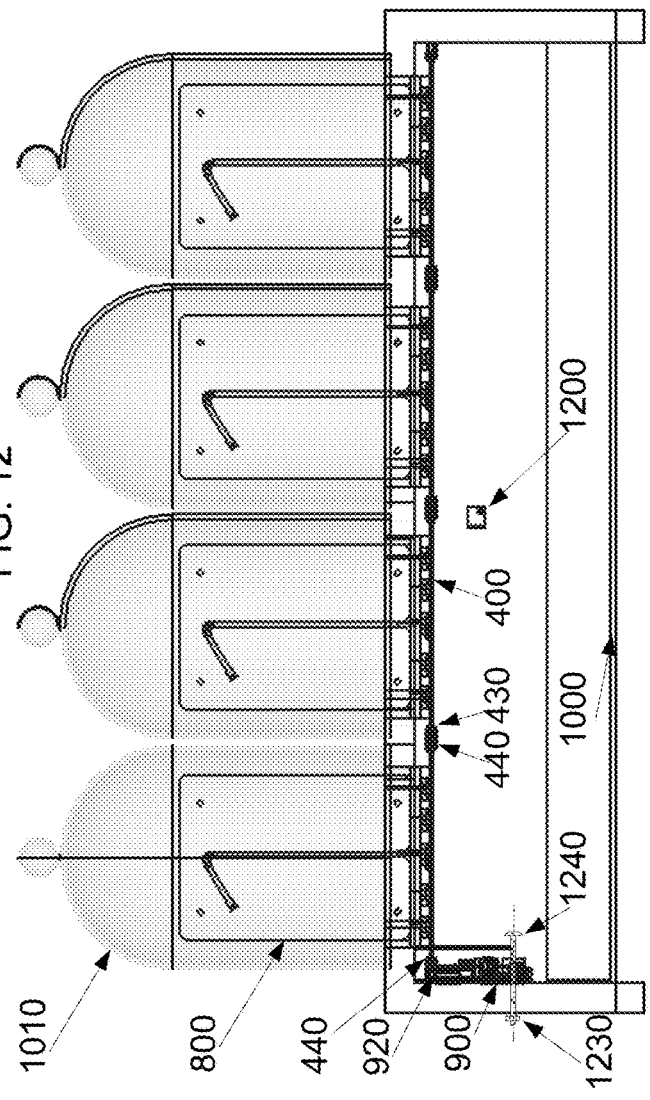

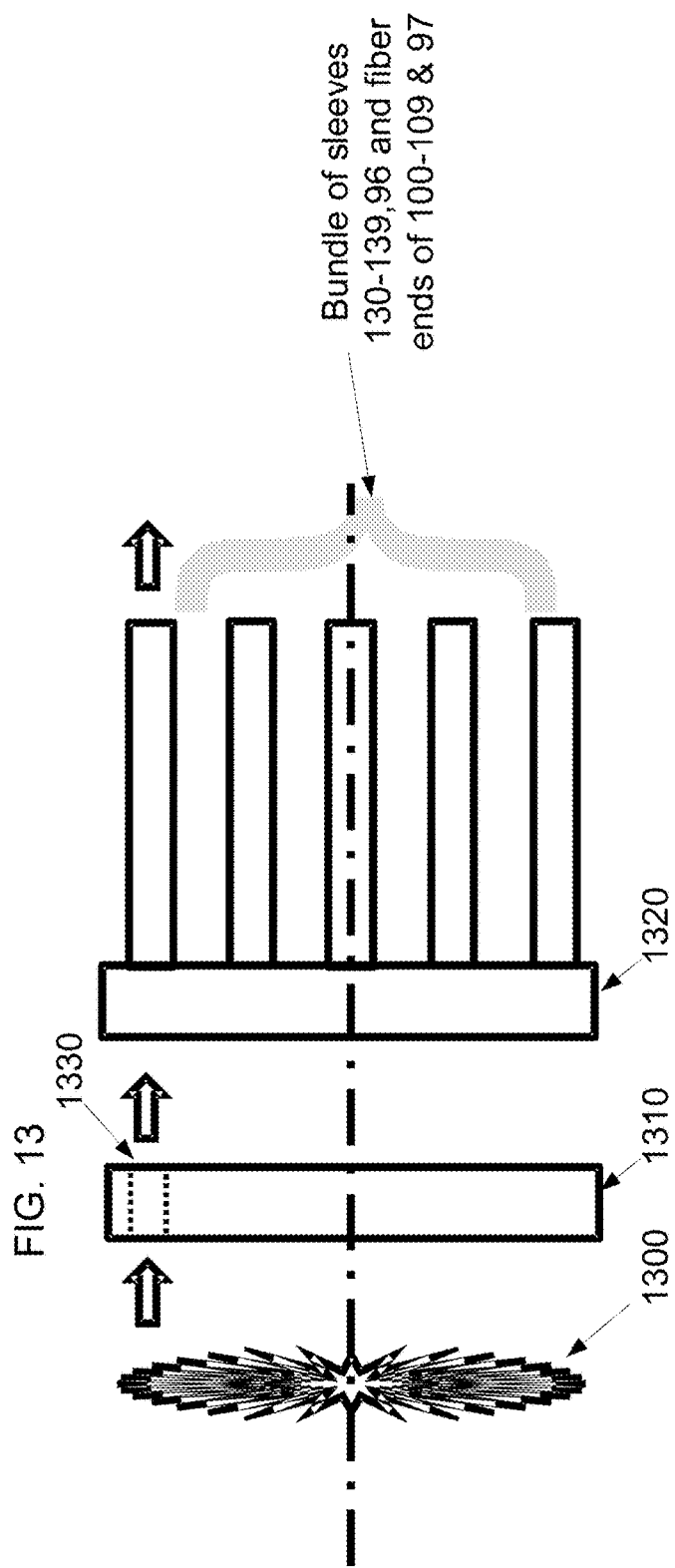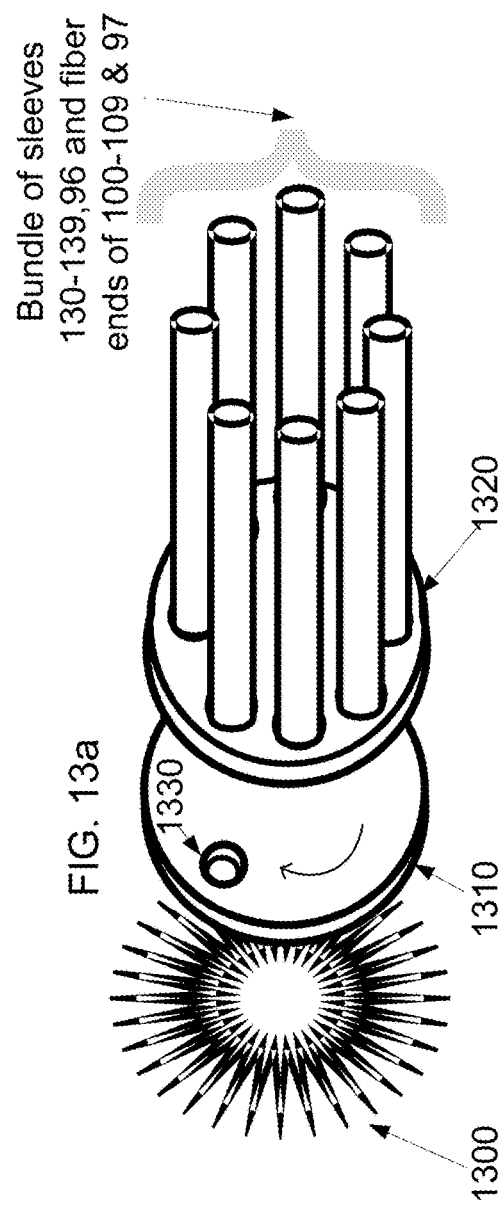

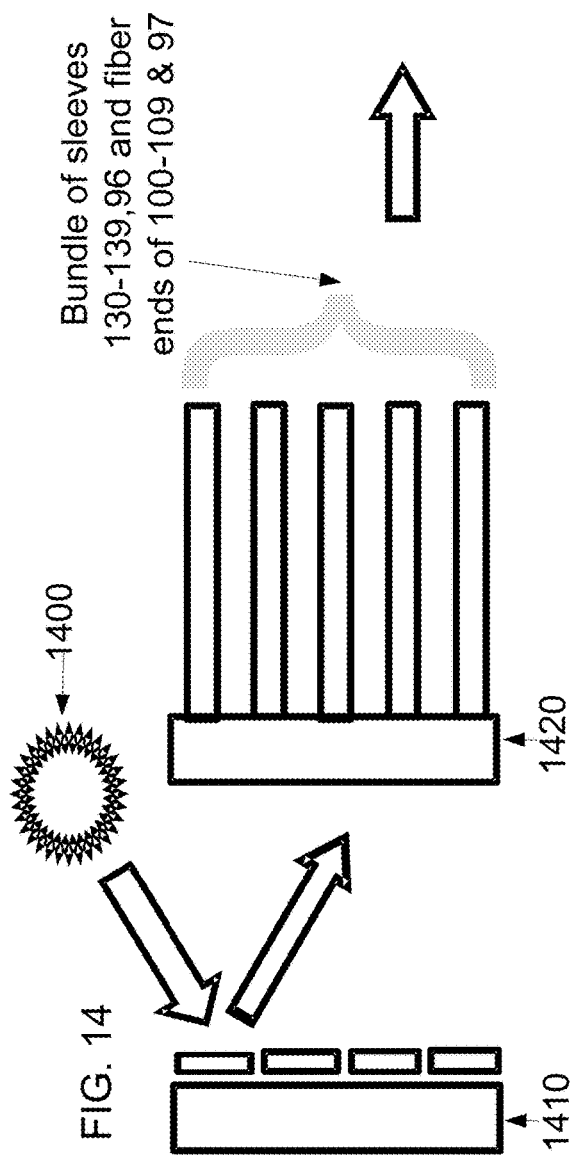
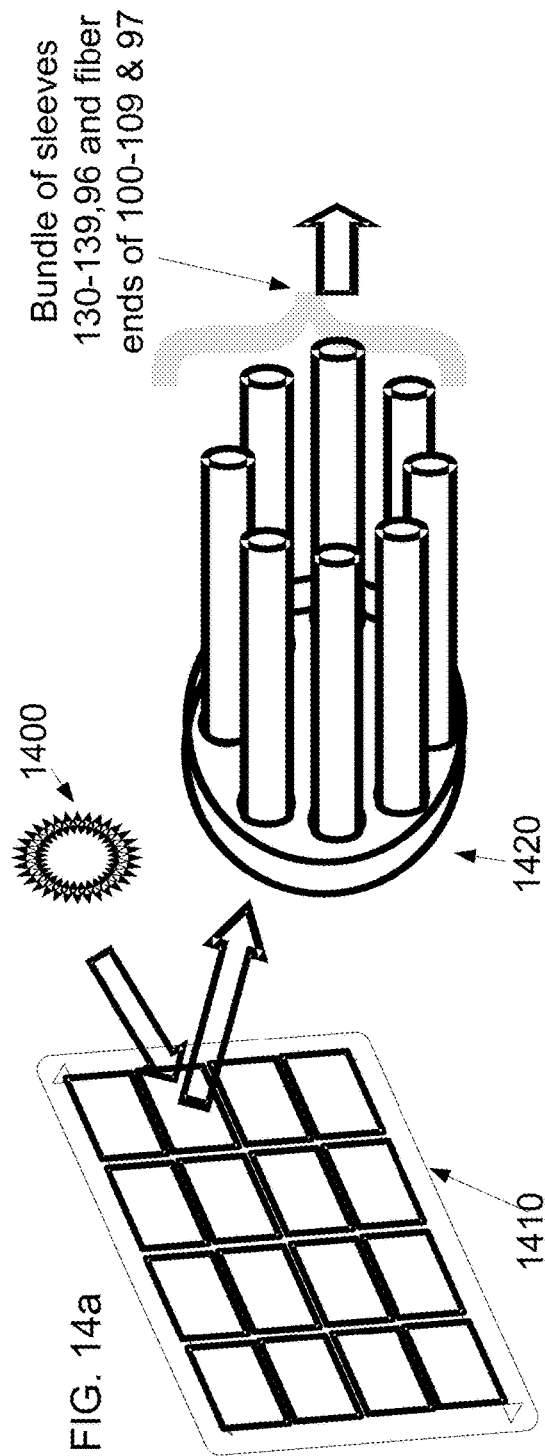

SYMBOLIC DISPLAY ELEMENTS UTILIZING SIDE EMITTING FIBERS AND LIGHT SOURCES

FIELD OF INVENTION

The present invention relates generally to display symbols utilizing substrates that emit light perpendicular to the direction of light from the light source using a substantially transparent substrate. In particular the present invention relates to substrates in the form of cylindrical fibers that emit light from the cylindrical surfaces when the source of light is at the ends of the cylindrical fiber and the cylindrical fiber is shaped to display a symbol.

PRIOR ART

The Inventor effectuated a patentability search yielding the following prior art in this field.

Prior art A: Light assembly for illuminating an emblem; U.S. Pat. No. 9,903,999; Inventors: Iordache et al.; Date: Feb. 27, 2018;

Prior art B: Decorative panel; U.S. Pat. No. 10,183,463; Inventor: Lath; Date: Jan. 22, 2019;

Prior art C: Light emitting decorative panels; U.S. Pat. No. 9,200,781; Inventors: Hudson et al.; Date: Dec. 1, 2015;

Prior art D: Flexible light pipe; U.S. Pat. No. 9,022,631; Inventors: Mulder et al.; Date: May 5, 2015;

Prior art E: Optical imaging system; U.S. Pat. No. 11,209,589; Inventors: Liu et al.; Date: Dec. 28, 2021;

Prior art F: Fiber optic face plate for a seamless modular display' U.S. Pat. No. 5,502,457; Inventors: Sakai et al.; Date: Mar. 26, 1996;

Prior art G: Modular display system; U.S. Pat. No. 4,263,736; Inventors: Beierwaltes et al.; Date: Apr. 28, 1981;

Prior art H: Display; U.S. Pat. No. 8,149,183 B2, Inventors: Fricke et al.; Date: Apr. 3, 2012;

Prior art I: Edge lighting system for interactive display surface; U.S. Pat. No. 7,453,419; Inventors: Yee et al.; Date: Nov. 18, 2008;

DESCRIPTION OF THE PRIOR ART

Most of the prior art specify, disclose and claim one or more of the following state of the art:
a. Prior art A: U.S. Pat. No.: 9,903,999; Iordache et al., describes a method and means to use partial occlusion to define a symbol or emblem. While the structure uses light guide as substrate, no claim is made to indicate a side emitting fiber to form the entirety of the symbol nor the emblem that does not include any occlusion on the majority of the symbol or the emblem;
b. Prior art B: U.S. Pat. No.: 10,183,463; Lath describe a means and methods to utilize a light conducting substrate with cavities for light emission, that are then displayed by partial coverage of the rest of the substrate for a claim of using light guide for decorative purposes. While the structure uses light guide as substrate, no claim is made to indicate a side emitting fiber to form the entirety of the light assembly;
c. Prior art C: U.S. Pat. No.: 9,200,781; Hudson et al., describe a means and methods to utilize a light conducting substrate with cavities for light emission, significantly modifying the substrate for internal reflections and avoiding shadows for an edge lit substrate. While the structure uses a substrate with predetermined depth etch modifications, no claim is made to indicate a side emitting fiber to form the entirety of the light assembly;
d. Prior art D: U.S. Pat. No.: 9,022,631; Mulder et al., describe a means and methods of using light guides for imaging and use of light guides which may include surface variation. While the structure uses a substrate with surface variations to allow edge lit flexible sheets to emit light in predetermined forms, no claim is made to indicate a side emitting fiber to form the entirety of the light assembly;
e. Prior art E: U.S. Pat. No.: 11,209,589; Liu et al., describe a means and methods of using light guides with surface variations and etchings with the use of external reflectors for the purpose of generating a virtual image. While the structure uses a substrate with surface variations to allow an edge lit rod or a plurality of edge lit rods to emit light in predetermined form, no claim is made to indicate a side emitting fiber with uniform surface light emitting property to form the entirety of the light assembly;
f. Prior art F: U.S. Pat. No.: 5,502,457; Sakai et al.; describe a means and methods of using optical fibers for the purpose of image transition. While the disclosure uses optical fibers to transport images, the optical fibers themselves are not shaped in the form of symbols for the entirety of the display;
g. Prior art G: U.S. Pat. No.: 4,263,736; Beierwaltes et al.; describe a means and methods of using modular elements to construct displays, and the modules being of the type of display commonly known in the state of the art as seven segment electronic display. While the means and methods describe external structures to assemble the display, no claim is made of the display elements being constructed of side emitting fibers;
h. Prior art H: U.S. Pat. No.: 8,149, 183; Fricke et al.; describe a means and methods of using flexible substrate with active pixel elements embedded within the substrate or built upon the substrate which are themselves sources of light upon electrical excitation. While the disclosure utilizes a flexible substrate no claim is made of display construction using passive side emitting fibers;
i. Prior art I: U.S. Pat. No.: 7,453,419; Yee et al.; describe a means and methods of using flexible substrates for edge lighted sheet for purposes of uniform lighting with or without visible light. While the disclosure indicates the use of an illuminated surface to enlighten an object placed on the surface of the display, no claim is made of the surface of the light emitter being the entirety of the display. Furthermore, no claim is made for the display being comprised of passive side emitting fiber.

BACKGROUND OF THE INVENTION

It is well known that there are many forms of display devices, starting with the proliferation of computer screens down to a single display element formed with enclosed light sources or other means of illumination. Also there are specific implementations of display symbols with light guides and substrates with etched surfaces that have internal light reflections to form meaningful displays. Disclosures within prior art have many display systems using light guides. These prior art disclosures do not utilize side emitting fibers. If the prior art discloses light guides, the light guides themselves have substrate surface modifications. Furthermore, there are prior art disclosures which make use of light guides that utilize either a partial substrate or the full part of the substrate for a display symbol, but also include significant occlusion of the main body of the substrate to form symbols.

SUMMARY OF THE INVENTION

The present invention generally relates to display systems, and more specifically to a display system comprised of a plurality of symbolic display elements formed with side emitting fiber substrates coupled to light emitting devices. The specific use of a side emitting fiber has the distinct advantage of forming arbitrary shapes with the present invention using this material to form display units which convey a style similar to light emitted from nixie tubes. The use of the side emitting fiber also couples to light sources of different frequencies and amplitudes with the same ease as that of any other form of edge lit displays. Further as the fiber is scaled in size, the amplitude and frequencies of light used to illuminate can be controlled utilizing state of the art technologies. The ease of manufacturing and testing of the side emitting fiber based systems depends only on the end-system design and is not limited by the size of the side emitting fiber. Such ease of manufacturing and testing leads directly to economic advantages for the present invention. Building separate modules for plurality of symbols and stacking the symbols further enhance the manufacturability and scalability of such display systems. The possibilities of using coherent light sources such as singular or plural lasers, semiconductor based or tube based lasers further enhance displays so that the displays may be visible in different ambient lights. Advantages, capabilities and possibilities to enhance display systems, regardless of the limits of the present invention disclosed here will become more apparent as the details in the description are studied in conjunction with the accompanying drawings.

BRIEF DESCRIPTION OF DRAWINGS

To ensure clarity and conciseness not all aspects or features of every diagram have been depicted or enumerated, as it will be apparent to those of ordinary skill in the art that the disclosures in the present invention are sufficient to embody an exemplary system.

FIG. 1 is the face view of an exemplary symbol comprising the side emitting fiber 101 shaped into the numeric symbol one (#1) by a surrounding transparent substrate 111.

FIG. 1a is the top view of FIG. 1.

FIG. 1b is the side view of FIG. 1.

FIG. 1c is the isometric view of FIG. 1.

FIG. 1d is the disassembled view of FIG. 1, showing the transparent substrate 111 with a shaped aperture 141 and assembly apertures or openings 150.

FIG. 1e is the disassembled view of FIG. 1, showing the side emitting fiber 101 with an end cap 120 and a sleeve 131.

FIG. 1f is the top view of the end cap 120.

FIG. 1g is the side view of the end cap 120.

FIG. 1h is the isometric view of the end cap 120 showing a reflecting internal surface 160.

FIG. 1i is the front view of the hollow sleeve 131.

FIG. 1j is the top view of the hollow sleeve.

FIG. 1k is the isometric view of the hollow sleeve 131, showing a reflective internal surface 170.

FIG. 2a is the face view of an exemplary symbol comprising a side emitting fiber 100 shaped into the numeric symbol zero (#0) by a surrounding transparent substrate 110 including the aperture 140 and the hollow sleeve 130.

FIG. 2b is substantially equivalent to FIG. 1 and included here for reference.

FIG. 2c is the face view of an exemplary symbol comprising a side emitting fiber 102 shaped into the numeric symbol two (#2) by a surrounding transparent substrate 112 including the aperture 142 and the hollow sleeve 132.

FIG. 2d is the face view of an exemplary symbol comprising a side emitting fiber 103 shaped into the numeric symbol three (#3) by a surrounding transparent substrate 113 including the aperture 143 and the hollow sleeve 133.

FIG. 2e is the face view of an exemplary symbol comprising a side emitting fiber 104 shaped into the numeric symbol four (#4) by a surrounding transparent substrate 114 including the aperture 144 and the hollow sleeve 134.

FIG. 2f is the face view of an exemplary symbol comprising a side emitting fiber 105 shaped into the numeric symbol five (#5) by a surrounding transparent substrate 115 including the aperture 145 and the hollow sleeve 135.

FIG. 2g is the face view of an exemplary symbol comprising a side emitting fiber 106 shaped into the numeric symbol six (#6) by a surrounding transparent substrate 116 including the aperture 146 and the hollow sleeve 136.

FIG. 2h is the face view of an exemplary symbol comprising a side emitting fiber 107 shaped into the numeric symbol seven (#7) by a surrounding transparent substrate 117 including the aperture 147 and the hollow sleeve 137.

FIG. 2i is the face view of an exemplary symbol comprising a side emitting fiber 108 shaped into the numeric symbol eight (#8) by a surrounding transparent substrate 118 including the aperture 148 and the hollow sleeve 138.

FIG. 2j is the face view of an exemplary symbol comprising a side emitting fiber 109 shaped into the numeric symbol nine (#9) by a surrounding transparent substrate 119 including the aperture 149 and the hollow sleeve 139.

FIG. 2k is the face view of an exemplary symbol 220 comprising a side emitting fiber 97 shaped into an arbitrarily shaped indicator including a surrounding transparent substrate 221 including the aperture 95 and the hollow sleeves 96.

FIG. 2l is the face view of an exemplary transparent substrate 210 substantially similar to the transparent substrate 110 comprising only of apertures or openings 150 for mechanical assembly.

FIG. 2m is a side view of an exemplary stack of symbols 200 that comprise of FIG. 2l at either end, and a specific arrangement of the FIG. 2a through FIG. 2k as shown with numerals 0 through 9 and the indicator depicted by the letter D.

FIG. 3 is the front view of an exemplary assembly of the stack 200 on a printed circuit board 400 comprising the masks 500 and 600, the collar 700, bolts 300, 310, 320 and the nuts 330, 340.

FIG. 3a is the top view of the FIG. 3.

FIG. 3b is the side view of FIG. 3.

FIG. 3c is the isometric view of FIG. 3.

FIG. 4 is the top view of an exemplary printed circuit board 400 comprising of a plurality of integrated circuits 410, 450, a plurality of light emitting devices 420, a plurality of connectors 430, 440, a plurality of mounting apertures or openings 460, 470.

FIG. 4a is the front view of FIG. 4.

FIG. 4b is the side view of FIG. 4.

FIG. 4c is the isometric view of FIG. 4.

FIG. 4d is an exemplary logical circuit representation of a singular control integrated circuit 410 comprised of a plurality of light emitting devices 420, where the light emitting devices may have different colors such as red (R), green (G) and blue (B); Note that the connectivity shown in FIG. 4d is not explicitly shown in the form of printed circuit layout drawings in the FIG. 4.

FIG. 5 is an exemplary top view of a mask 500, comprising a plurality of shaped openings or apertures 510, and a plurality of mounting apertures 520.

FIG. 5a is the front view of FIG. 5.
FIG. 5b is the side view of FIG. 5.
FIG. 5c is the isometric view of FIG. 5.

FIG. 6 is an exemplary top view of a mask 600, comprising a plurality of openings or apertures 610 to accommodate fibers 100 through 109 and 97 with sleeves 130 through 139 and 96, and a plurality of mounting apertures 620.

FIG. 6a is the front view of FIG. 6.
FIG. 6b is the side view of FIG. 6.
FIG. 6c is the isometric view of FIG. 6.

FIG. 7 is an exemplary top view of a collar 700, comprising an aperture 710 to accommodate the stack of symbols 200 and a plurality of mounting apertures 720 and 730.

FIG. 7a is the front view of FIG. 7.
FIG. 7b is the side view of FIG. 7.
FIG. 7c is the isometric view of FIG. 7.

FIG. 8 is an exemplary isometric view of a minimal symbol assembly, comprising the exemplary symbol depicted in FIG. 1, the printed circuit board 400 of FIG. 4, masks 500 of FIG. 5, 600 of FIG. 6 and the collar 700 of FIG. 7 and it should be obvious for those skilled in the art of similar assemblies, that the FIG. 8 is a subset of FIG. 3.

FIG. 8a is an exemplary isometric view of the FIG. 1's end cap 120 showing how the end cap mates with the symbol comprising the side emitting fiber 101.

FIG. 8b is the close up view FIG. 8a showing the end cap 120.

FIG. 8c is the cross section of FIG. 8b at "AA" including the cross section of the end cap.

FIG. 8d is the close up of the symbol of FIG. 1's coupling with the light emitting device 420 on the printed circuit board 400, with the sleeve 131.

FIG. 8e is the cross section of FIG. 8d at "BB" including the printed circuit board 400, masks 500, 600, collar 700, transparent substrate 111 with the slot 141, sleeve 131 with reflecting inner surface 170, and the side emitting fiber 101.

FIG. 9 is an exemplary block diagram of a control system comprised of a micro control module 910, a display connector 920, a power supply connector 930, an audio encoder and decode module 940, a plurality of audio transformers 950, an external sensors connector 960, an audio amplifier with volume control 970, a secure digital memory module 980 and mounting apertures or openings 980 in the printed circuit board 900. Note that connectivity of all these blocks are not shown as those skilled in the art can easily envision plurality of interconnections utilizing state of the art industry standard interconnects.

FIG. 9a is a top view of an exemplary physical implementation 900 of FIG. 9.

FIG. 9b is the front view of FIG. 9a.
FIG. 9c is the right view of FIG. 9a.
FIG. 9d is the left view of FIG. 9a.
FIG. 9e is an isometric view of FIG. 9a.
FIG. 9f is an abstract summary of the logical flow diagram of machine instructions executed inside the microcontroller 910 of the physical implementation 900 of FIG. 9a.

FIG. 10 is an exemplary front view of a complete system comprising a plurality of FIG. 3, enclosed in a transparent cylindrical cloche 1010, on an enclosure box 1000.

FIG. 11 is an exemplary front view of the enclosure box 1000, comprising a plurality of apertures 1110, 1120 and 1130.

FIG. 11a is the top view of FIG. 11.
FIG. 11b is the side view of FIG. 11.
FIG. 11c is the isometric view of FIG. 11.

FIG. 12 is an exemplary front view of the exemplary system comprising a plurality of assemblies of FIG. 8, a plurality of the transparent cloches 1010, the enclosure box 1000, the control system of FIG. 9, a volume control knob 1200, screw bolts 1210, 1250, nuts 1220, 1240, an external sensor 1230.

FIG. 12a is the top view of FIG. 12 showing enumerations 440 and 430 showing mating of a plurality of printed circuit boards 400 of FIG. 4.

FIG. 12b is the side view of FIG. 12 showing screw bolt 1210 and nut 1220 as part of the assembly of FIG. 12.

FIG. 12c is the isometric view of FIG. 12.

FIG. 13 is a front view of one type of an exemplary alternate embodiment of light illuminating mechanism comprising a light source 1300, a manifold assembly 1320 with the bundle of fiber ends comprising sleeves 130 through 139 and 96 for the fiber ends of 100 through 109 and 97, a rotating disc 1310 with an aperture 1330 for illuminating a singular fiber of the bundle 100 through 109 and 97.

FIG. 13a is an isometric view of the FIG. 13

FIG. 14 is the front view of another exemplary embodiment of light illuminating mechanism comprising a light source 1400 a digital micro mirror device 1410, a manifold assembly of 1420 with the bundle of fiber ends comprising sleeves 130 through 139 and 96 for the fiber ends of 100 through 109 and 97.

FIG. 14a is an isometric view of FIG. 14.

DETAILED DESCRIPTION OF THE INVENTION

In the description that follows, references are made to the accompanying drawings that forms a part hereof and in which various embodiments are shown by the way of illustration.
It is possible that the drawings are not proportionally accurate. Various views of the main figure are included for clarity with enumerations of the main figure incorporated into different views. Therefore the descriptions may not include elaborations of different views. For those skilled in the art, other embodiments may be contemplated without departing from the scope or spirit of the present disclosure. Therefore, the following description is not limiting.

FIG. 1 is the front view of a symbol in one embodiment which comprises a transparent sheet 111 of common materials such as clear acrylic or clear polycarbonate, whose thickness is substantially the same as the side emitting fiber 101. Further the transparent sheet 111 has an aperture or slot 141 that is exactly the shape of the numerical symbol one (#1). The side emitting fiber 101 with an end cap 120 and a sleeve 131 is inserted into the slot 141 to conform the side emitting fiber 101 into the numerical symbol one (#1). Further the transparent sheet 111 has a plurality of apertures or holes 150 to aid in an assembly of a plurality of stacked symbols. FIG. 1d shows only the transparent sheet 111 with the slot 141 and the plurality of assembly apertures or holes 150. FIG. 1e shows only the side emitting fiber 101 with the end cap 120 and the sleeve 131. FIG. 1f is the top view of the end cap. The isometric view FIG. 1h shows the same end cap 120 with an internal reflecting surface 160. FIG. 1i is the front view of the sleeve 131. The isometric view FIG. 1k shows the internal reflecting surface 170 of the sleeve 131.

FIG. 2a, FIG. 2c, FIG. 2d, FIG. 2e, FIG. 2f, FIG. 2g, FIG. 2h, FIG. 2i, FIG. 2j, are symbols formed substantially similar to FIG. 1. FIG. 2b is a scaled reproduction of FIG. 1 for the purpose of showing a complete set of a plurality of symbols. The diagrams of FIG. 2a, FIG. 2c, FIG. 2d, FIG. 2e, FIG. 2f, FIG. 2g, FIG. 2h, FIG. 2i, FIG. 2j, show various lengths of side emitting fibers 100, 102, 103, 104, 105, 106, 107, 108, and 109 embedded into apertures or slots 140, 142, 143, 144, 145, 146, 147, 148, 149 of the transparent substrates 110, 112, 113, 114, 115, 116, 117, 118 and 119 substantially similar to substrate 111 of FIG. 1 excepting that the shapes of apertures or slots 140, 142, 143, 144, 145, 146, 147, 148, and 149 conform to the numerical shapes of symbols depicted. The substrates 110, 112, 113, 114, 115, 116, 117, 118 and 119 have substantially same assembly apertures or holes 150 as FIG. 1. The side emitting fibers 100, 102, 103, 104, 105, 106, 107, 108, and 109, all have end caps 120 substantially same as FIG. 1. Further, the side emitting fibers 100, 102, 103, 104, 105, 106, 107, 108, and 109, all have sleeves 130, 132, 133, 134, 135, 136, 137, 138, 139 similar to 131 the sleeve of FIG. 1, excepting the length of the sleeves 130,132, 133, 134, 135, 136, 137, 138, 139 are of various length to occlude parts of the side emitting fibers 100, 102, 103, 104, 105, 106, 107, 108, 109 for human recognition of numeric symbols when the side emitting fibers are illuminated. Therefore, the diagrams of FIG. 2a, FIG. 2b, FIG. 2c, FIG. 2d, FIG. 2e, FIG. 2f, FIG. 2g, FIG. 2h, FIG. 2i, FIG. 2j, represent numerical symbols zero (#0), one (#1), two (#2), three (#3), four (#4), five (#5), six (#6), seven (#7), eight (#8) and nine (#9) respectively.

The FIG. 2k is illustrative of an arbitrary symbol 220. The arbitrary symbol 220 comprises of a transparent substrate 221 with a slot 95 where a length of side emitting fiber 97 is embedded. The substrate of 221 includes apertures or holes 150 substantially same as those of FIG. 1. The side emitting fiber 97 includes a plurality of sleeves 96, 98 occluding parts of the side emitting fiber 97. Further the side emitting fiber 97 has an end cap 120, substantially same as FIG. 1.

The FIG. 2l is illustrative of a transparent substrate 210, also called end plate, utilized for the purpose of assembling a stack of symbols of FIG. 2a through FIG. 2k. The end plate 210 is comprised of a transparent substrate 210 that is substantially same as 111 of the FIG. 1 excepting that the substrate of 210 include neither any side emitting fibers nor any slots. The substrate of 210 includes apertures or holes 150 substantially same as those of FIG. 1.

The FIG. 2m is an illustrative side view of an assembly of symbols of FIG. 2a, FIG. 2b, FIG. 2c, FIG. 2d, FIG. 2e, FIG. 2f, FIG. 2g, FIG. 2h, FIG. 2i, FIG. 2j, FIG. 2k, FIG. 2l into a stack 200 as indicated by the enumerations 110, 111, 112, 113, 114, 115, 116, 117, 118, 119, 220 and 210, in a particular order as illustrated by the numbers 0, 1, 2, 3, 4, 5, 6, 7, 8, 9 and the letter "D" for the indicator of FIG. 2k. The ends of the side emitting fibers of 100, 101, 102, 103, 104, 105, 106, 107, 108, 109 and 97 occluded by the sleeves of 130, 131, 132, 133, 134, 135, 136, 137, 138, 139, and 96, protrude out of the transparent substrates 110, 111, 112, 113, 114, 115, 116, 117, 118, 119 and 221 as indicated by the enumeration 201. Further the stack of 200 illustrates that the apertures or holes 150 of all the transparent substrates 110, 111, 112, 113, 114, 115, 116, 117, 118, 119, 221 and 210 are in substantial alignment to allow bolts for assembly.

FIG. 3 is the front view of a plurality of symbols as an exemplary embodiment of a system indicating a set of numeric symbols zero (#0) through nine (#9) which may be utilized as a display of numerals zero (#0) through nine (#9) when the side emitting fibers of 100 through 109 and 97 are illuminated by light sources from the sleeved end of the fibers. The FIG. 3 is comprised of the stack of symbols 200, assembled on top of a printed circuit board 400, utilizing a plurality of masks 500, 600 and a collar 700, all held together by bolts 300, 310, 320 and nuts 330, 340. Further the top view FIG. 3a, side view FIG. 3b and the isometric view FIG. 3c, are enumerated to clearly illustrate the entire assembly of FIG. 3.

FIG. 4 is the front view of an exemplary printed circuit board 400, populated with components and used to provide a plurality of the following functions and utilities:

a. sources of light by the light emitting diodes 420, commonly referred to as LEDs, where in each of the LEDs may have a plurality of frequencies of emitted light, and the main frequency of emitted light may be obtained by a mix of primary colors such as red (R), green (G) and blue (B);

b. the plurality of device 410, may be used to control the amplitude and frequency of the light output of the plurality of LEDs 420 via interfaces such as inter integrated circuits 480 as enumerated in the FIG. 4d, commonly known as I2C bus;

c. as an example, the integrated circuit device for the utility of 410 illustrated in FIG. 4d enumerated as TLC59116, is a commercially available integrated circuit device from the Texas Instruments company and the complete description regarding physical implementation, operation and control is incorporated herein as reference;

d. connectors 430, 440 provide a means to couple the interface signals, comprising +5V, +3.3V, SDA, SCL, Reset and ground return of 480 of FIG. 4d implemented on the printed circuit board 400, to another similar printed circuit board 400, or a central processing unit on another printed circuit board 900 described elsewhere in the present invention;

e. other exemplary control device 450, the details of which are not included in the present disclosure as it should be evident to those skilled in the art, provided on the printed circuit board 400 as a means to facilitate communication between external devices such as push button switches for user input to communicate to the central processing unit 900 via the connectors of 430 and 440;

f. the plurality of apertures or holes 460 on the printed circuit board 400 provide a means for coupling the stack 200, the masks 500, 600 and the collar 700, to couple the sleeved ends of the side emitting fiber of 100 through 109 and 97, to the LEDs as well as enforce the coupling during the operating life of the system in the present invention;

g. the plurality of apertures 470 on the printed circuit board 400 provide a means to couple a plurality of printed circuit boards 400, to any enclosure as described later in the present invention.

FIG. 5 is the front view of an exemplary mask 500, comprised of material such as opaque black acrylic, with shaped apertures or holes 510 cut through the thickness of the material. The thickness of the material 500 is substantially equivalent to the mounted height of the LEDs. Therefore the mask provides a means to occlude light emitted by the LEDs 420 by enclosing the LEDS within the LED shaped apertures. The occlusion of light emitted by LEDs 420 is a means to prevent light from a singular LED that is sourcing light into a singular end of a singular symbol's side emitting fiber, such as 100, into interfering or illuminating a different symbols side emitting fibers, such as 101 through 109. As such the exemplary mask 500 provides a means of illuminating a singular or a plurality of side emitting fibers for displays that require multiple symbols to be illuminated. Other featured such as apertures or holes 520 provide a means for coupling the mask 500 to the printed circuit board 400. Other views of FIG. 5 in the form of top view FIG. 5*a*, side view FIG. 5*b* and isometric view FIG. 5*c* are shown for clarity of description.

FIG. 6 is the front view of an exemplary mask 600, comprised of material such as opaque black acrylic, with shaped apertures or holes 610 cut through the thickness of the material. The thickness of the material 600 is a means to couple and hold the sleeved end of fibers 100 through 109 and 97 to the emitting surfaces of the LEDs 420, and the thickness may be sufficient to serve the purpose of hold as well as completely mask any emitted light by the LEDs 420 to escape and interfere with other side emitting fibers of 100 through 109 and 97, other than the intended singular side emitting fiber is illuminated and to which the LED is coupled. Other featured such as apertures or holes 620 provide a means for coupling the mask 600 to the printed circuit board 400. Other views of FIG. 6 in the form of top view FIG. 6*a*, side view FIG. 6*b* and isometric view FIG. 6*c* are shown for clarity of description.

FIG. 7 is the front view of an exemplary collar 700, comprised of material such as opaque black acrylic or wood with sufficient strength, with an aperture or hole 710 cut through the thickness of the material. The thickness of the material 700 is a means to couple and hold the stacked plurality of symbols 200 as illustrated in FIG. 2*m* to the printed circuit board 400. The dimension of the aperture 710 is made substantially same as the dimension of the stacked plurality of symbols 200 as will become apparent in the description of FIG. 8. Further the apertures 720 and 730 are provided as a means for the bolts to couple and hold the assembly of printed circuit board 400, masks 500 and 600.

FIG. 8 is an isometric view of an exemplary singular symbol of FIG. 1 shown in conjunction of the other components printed circuit board 400, masks 500, 600 and collar 700 in this display. For those skilled in the art it should be evident that the stack of plurality of symbols 200 in FIG. 2*m* may be utilized. This FIG. 8 is simplified for the purposes of clarity and should not be construed as limiting. FIG. 8*a* and FIG. 8*b* are closer views of the embedded side emitting fiber 101, with the end cap 120, showing the side emitting fiber 101 being contained in the plane of the transparent substrate 111 where the aperture or slot 141 is provided as the means for conforming the shape of number one (#1). FIG. 8*c* is the cross section of FIG. 8*b* at "AA". FIG. 8*c* illustrates the end cap 120 with the inner lining 160 fitting snugly around the end of the side emitting fiber 101, and the assembly of end cap 120 with the side emitting fiber 101 enclosed into the slot 141 of the transparent substrate 111. FIG. 8*d* is a closer isometric view of the opposite end of the side emitting fiber 101 coupling into a singular LED 420, with the masks 500, 600 and the collar 700. FIG. 8*e* is the cross section of FIG. 8*d* at "BB" illustrating the cross sections of the side emitting fiber 101, inside the slot 141 of the transparent substrate 111. The end of the side emitting fiber 101 is covered by the sleeve 131 including the inner reflective surface 170. Further the assembly if the fiber 101 with the sleeve 131 is inserted into aperture 610 of the mask of 600, and couples with the LED 420 on the printed circuit board 400. The LED 420 is enclosed inside the slot 510 of the mask 500. The entirety of the assembly therefore may be used to for a display unit for the numeral zero (#0) through nine (#9) and an indicator 220 as illustrated in the FIG. 3, and the assembly held together with the bolts and nuts as illustrated in the figures of FIG. 3*a*, FIG. 3*b* and FIG. 3*c*.

FIG. 9 is an exemplary block diagram of a central processing and control means to operate the display system comprising singular or a plurality of the assembly of FIG. 3. The block diagram of FIG. 9 illustrates a composition of major functions such as a microcontroller module such as the ESP32 910, which is coupled to several components on the system such as:

a. a display unit connector 920 that interfaces with the socket 440;
  b. a power jack 930 that supplies power to the entire system;
  c. an audio encoder decoder module 940 coupled to audio transformers 950;
  d. an auxiliary connector 960 which may be used to couple to external sensors such as humidity, temperature ambient light, barometric pressure, accelerometer etc.;
  e. an audio amplifier 970 coupled to the audio transformers 950 and external speakers not shown in the illustration;
  f. a secure digital memory module 980 for storing plurality of data such as audio, video and control information as well as control program data.

FIG. 9*a* is the top view of an exemplary implementation of FIG. 9 illustrating an assembly of the modules mentioned in the description of FIG. 9 on the printed circuit board 900. An additional enumeration of the volume control knob 990 is a part of the amplifier module of 980. Additional features such as mounting apertures or holes 999 are provided on the printed circuit board 900, for physical assembly inside enclosures.

FIG. 9*b*, FIG. 9*c*, FIG. 9*d* and FIG. 9*e* are different views of FIG. 9, illustrating the plurality of modules, components and projection of connectors on the printed circuit board of 900.

FIG. 9*f* is a brief outline of the process of control flow of an exemplary program executed on the micro controller 910 on the printed circuit board 900. While the outline shows a small subsection of control flow, those skilled in the art should not consider the illustration as limiting. For example, the control may include the microcontroller 910 asserting the signals of the 12C bus coupled to a plurality of printed circuit boards 400, to generate control commands and data to turn ON or OFF a plurality of LEDs 420 distributed across a plurality of printed circuit boards 400 as a clock system illustrated in later figures. Other functions embedded in such a microcontroller 910 for program execution may include, but are not limited to:

a. an identity database set up operation, such as set the users identity, a password, utilizing Bluetooth wireless channels by coupling to a mobile smart phone where in an application program communicates with the microcontroller 910;
  b. a set up operation for a wireless Ethernet interface commonly known as WiFi characteristics, by utilizing Bluetooth channels by coupling to a mobile smart phone, where in an application program communicates with the microcontroller 910;
  c. a WiFi communication channel to interface to the internet and any associated servers or clients;

d. a clock function displaying time of day utilizing the hardware described in the previous illustrations and descriptions;
e. set alarms on the clock function, where in the alarm comprises of communication wirelessly to server to retrieve or deposit digital or audio streams or messages;
f. set up alarms that may repeat over a period of time, per user instructions on the mobile smart phone device communicated to the present invention across the Bluetooth or WiFi channels;
g. send and retrieve audio streams of data, play such data over the audio encoder or decoder;
h. send and retrieve digital audio messages and play such messages over the audio encoder or decoder;
i. a set of alarms that may be repetitively activated by the microcontroller 910;
j. communicate with a control server to limit the audio streaming or messaging to a select few as programmed by an application on a mobile smart phone.
k. measuring and utilizing external sensors such as ambient light sensors for controlling the intensity of LEDs 420;
l. measuring and displaying external sensors data such as humidity, temperature pressure, etc, via appropriate symbolic display elements in the stack of symbols 200.

FIG. 10 is an exemplary front view of a clock system comprised of a plurality of symbolic display elements 300 of FIG. 3, coupled to a central control system 900, and enclosed in a box 1000. A plurality of glass cloches 1010 is placed on top of the plurality of display elements to illustrate a "nixie" tube appearance to the end user.

FIG. 11 is an exemplary front view of the enclosure 1000, illustrating a plurality of apertures or holes 1120, 1130 shaped to enable the assembly of the plurality of display elements 300 of FIG. 3. An aperture 1110 is also provided for the end user to access both the volume knob 990 of FIG. 9a and the secure digital memory 980 module for loading secure digital memory cards.

FIG. 12 is an exemplary implementation of FIG. 11; FIG. 12 illustrates how a plurality of display units 800 of FIG. 8 couple to other display units 800 of FIG. 8 via connectors 440, 430 as well as the central processing and control system 900's connector 920, inside the enclosure of 1000. The components 800 of FIG. 8, the control system 900 are mounted inside the enclosure of 1000, via bolts 1210, 1230 and nuts 1220, 1240, only a few of which are illustrated for clarity. It should be evident to those skilled in the art that the display element 800 is illustrative for clarity only and may be easily replaced by the assembly 300 of FIG. 3. An external ambient light sensor 1200 is shown for illustrative purposes only.

FIG. 13 is an exemplary alternative illustrating the illumination of the fiber ends 100 through 109 and 97 may be mounted on a manifold 1320, while a rotating mask 1310 with an aperture or hole of 1330 enables a singular source of light 1300 to illuminate a singular fiber end of 100 through 109 and 97. While the embodiment, description and operation of such an assembly is beyond the descriptive narrative of the present invention, it will be obvious to those skilled in the art that different control means and mechanisms are required for physical realization of this alternative means. FIG. 13a is an isometric view of FIG. 13 included here for clarity.

FIG. 14 is yet another exemplary alternative illustrating the illumination of the fiber ends 100 through 109 and 97 may be mounted on a manifold 1420. This embodiment envisages the utility of a digital micro mirror device 1410 to bounce off a portion of the singular light source 1400 to illuminate any singular or plurality of fiber ends of 100 through 109 and 97. While the embodiment, description and operation of such an assembly is beyond the descriptive narrative of the present invention, it will be obvious to those skilled in the art that different control means and mechanisms are required for physical realization of this alternative means. FIG. 14a is an isometric view of FIG. 14 included here for clarity.

Concluding the description narrative, it is to be understood that the above description is an exemplary illustration of the present invention and is neither limiting nor restrictive to the above-described embodiments. To those skilled in the art many modifications may be made to adapt a different physical structure or material without departing from the scope of teachings of the present invention. Any references in the above descriptions to materials, dimensions are intended to illustrate parameters of the embodiments as examples. Further the descriptive language in the narrative of this disclosure should be interpreted in the spirit of a patent disclosure rather than a literal interpretation of a technically accurate English language with a technically accurate punctuation. Therefore it is not intended that the scope of the claims of the present invention be limited to this patent disclosure, but that the claims be broadly construed.

What is claimed is:

1. A display for information comprising:
   a plurality of stacked display elements, each display element including:
   a transparent substrate; and
   a side-emitting optical fiber embedded in the transparent substrate;
   wherein the side-emitting optical fiber forms a symbolic element;
   a source of light coupled to the side-emitting optical fibers of the stacked display elements to illuminate the symbolic elements; and
   a means to control the source of light.

2. The display of claim 1, wherein the symbolic element of each display element includes one or more symbols.

3. The display of claim 2, wherein the symbols comprise alpha numeric symbols, images, and/or shapes.

4. The display of claim 1, wherein the side-emitting optical fiber comprises a cylindrical flexible substrate having an axis that light traverses and distributed reflectors embedded in the cylindrical flexible substrate that allow uniform dispersion of the light from the entirety of the cylindrical flexible substrate.

5. The display of claim 1, wherein a whole or a part of the transparent substrate of each display element is illuminated.

6. The display of claim 1, wherein the side-emitting optical fiber of each display element include one contiguous optical fiber or multiple optical fibers.

7. The display of claim 1, wherein the symbolic element of each display element is a singular contiguous symbol or a combination of a plurality of symbols.

8. The display of claim 1, further including masks to conceal and reflect light within the transparent substrate of one or more display elements.

9. The display of claim 1, wherein the side-emitting optical fiber is embedded in a slot of the transparent substrate of each display element to maintain a shape of the symbolic element.

10. The display of claim 1, wherein the source of light includes a plurality of light emitting devices of multiple frequencies of light or of a singular frequency of light.

11. The display of claim 1, wherein the source of light includes a plurality of light emitting devices coupled to the transparent substrate of each display element.

12. The display of claim 1, wherein the source of light includes a single light emitting device coupled to the transparent substrates of the stack of display elements.

13. The display of claim 1, wherein the source of light includes a plurality of light emitting devices and each light emitting device emits multiple frequencies of light.

14. The display of claim 13, further including a means to turn on or off a selective frequency of the multiple frequencies of light.

15. The display of claim 1, wherein the source of light is applied continuously or intermittently.

16. The display of claim 1, wherein the source of light includes a
   plurality of light emitting devices, and further comprising at least one electronic switch to turn on or off the plurality of light emitting devices individually or simultaneously.

17. The display of claim 1, further comprising a means of light modulation independent of the source of light.

18. The display of claim 1, further comprising a control system to control functions of the display.

19. The display of claim 18, wherein the control system is a central processing and control means including at least one of a display unit, a power jack, an audio encoder/decoder, audio transformers, audio amplifier, volume control module, an auxiliary connector coupled to sensors, and/or a secure digital memory module that stores audio data, video data, control information, and/or control program data.

* * * * *